(12) United States Patent
Ozawa et al.

(10) Patent No.: US 12,441,218 B2
(45) Date of Patent: *Oct. 14, 2025

(54) VEHICLE SEAT

(71) Applicant: TS TECH CO., LTD., Asaka (JP)

(72) Inventors: Hidetoshi Ozawa, Tochigi (JP);
Naohiro Sasaki, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/654,894

(22) Filed: May 3, 2024

(65) Prior Publication Data

US 2024/0294096 A1     Sep. 5, 2024

Related U.S. Application Data

(63) Continuation of application No. 18/183,412, filed on Mar. 14, 2023, now Pat. No. 12,005,812, which is a
(Continued)

(30) Foreign Application Priority Data

| Sep. 3, 2018 | (JP) | ................................. 2018-164256 |
| Oct. 11, 2018 | (JP) | ................................. 2018-192290 |
| Oct. 11, 2018 | (JP) | ................................. 2018-192291 |

(51) Int. Cl.
    *B60N 2/56*        (2006.01)
    *B60N 2/00*        (2006.01)
    *B60R 16/02*      (2006.01)

(52) U.S. Cl.
CPC ......... *B60N 2/5621* (2013.01); *B60N 2/0022* (2023.08); *B60N 2/0026* (2023.08);
(Continued)

(58) Field of Classification Search
CPC .... B60N 2/002; B60N 2/5621; B60N 2/5685; B60N 2/5628; B60N 2/5635; B60N 2/5657; B60R 16/0215
(Continued)

(56) References Cited

U.S. PATENT DOCUMENTS

| 4,832,403 A | 5/1989 | Tomita |
| 4,848,795 A | 7/1989 | Muraishi |

(Continued)

FOREIGN PATENT DOCUMENTS

| EP | 2168820 | 3/2010 |
| EP | 2786896 | 10/2014 |

(Continued)

OTHER PUBLICATIONS

Japanese Office Action (w/ English translation) for corresponding Application No. 2023-212984, dated Oct. 1, 2024, 17 pages.
(Continued)

*Primary Examiner* — Rodney B White
(74) *Attorney, Agent, or Firm* — Dority & Manning, P.A.

(57) ABSTRACT

A wire harness connected to a sensor is positioned on a back surface of a pad of a vehicle seat supported by a panel. The vehicle seat includes a panel; a pad supported by the panel; a skin material covering a front surface of the pad; and a sensor provided between the front surface of the pad and the skin material for acquiring information on a seat occupant, wherein the pad is provided with a through hole passed from the front surface of the pad to a back surface of the pad, and a recess formed in the back surface of the pad and connected to the through hole, the wire harness connected to the sensor extending in the through hole and the recess.

18 Claims, 19 Drawing Sheets

Related U.S. Application Data continuation of application No. 17/273,041, filed as application No. PCT/JP2019/026344 on Jul. 2, 2019, now Pat. No. 11,642,983.

(52) U.S. Cl.
CPC ......... *B60N 2/0033* (2023.08); *B60N 2/0034* (2023.08); *B60N 2/5628* (2013.01); *B60N 2/5635* (2013.01); *B60N 2/5657* (2013.01); *B60N 2/5685* (2013.01); *B60R 16/0215* (2013.01); *B60N 2210/12* (2023.08); *B60N 2210/30* (2023.08); *B60N 2210/46* (2023.08); *B60N 2210/48* (2023.08)

(58) Field of Classification Search
USPC .............. 297/180.1–180.16, 217.3, 253
See application file for complete search history.

(56) References Cited

U.S. PATENT DOCUMENTS

| | | | |
|---|---|---|---|
| 5,292,178 A | 3/1994 | Loose | |
| 5,918,934 A | 7/1999 | Siegrist | |
| 5,950,978 A | 9/1999 | Eguchi | |
| 6,011,318 A | 1/2000 | Mayoras | |
| 6,059,018 A | 5/2000 | Fijii | |
| 6,478,369 B1 | 11/2002 | Aoki | |
| 7,207,833 B2 | 4/2007 | Jeong | |
| 7,598,881 B2 | 10/2009 | Morgan | |
| 7,942,477 B1 | 5/2011 | Toba et al. | |
| 8,115,648 B2 | 2/2012 | Lorenz et al. | |
| 8,226,145 B2 | 7/2012 | Kasuya | |
| 8,328,280 B2 | 12/2012 | Parker | |
| 9,004,993 B2 | 4/2015 | Yoshinori | |
| 11,027,631 B2 | 6/2021 | Hoshi | |
| 11,642,983 B2 | 5/2023 | Ozawa et al. | |
| 12,005,812 B2* | 6/2024 | Ozawa | B60N 2/0033 |
| 2002/0000742 A1 | 1/2002 | Wato | |
| 2002/0002854 A1 | 1/2002 | Imoto et al. | |
| 2002/0050730 A1 | 5/2002 | Kondo | |
| 2004/0036326 A1 | 2/2004 | Bajic | |
| 2004/0245811 A1 | 12/2004 | Bevan | |
| 2005/0061643 A1 | 3/2005 | Rainey | |
| 2005/0140189 A1 | 6/2005 | Bajic | |
| 2006/0181119 A1 | 8/2006 | Wolfe | |
| 2006/0192416 A1 | 8/2006 | Wolfe | |
| 2007/0046080 A1 | 3/2007 | Muneta | |
| 2007/0241592 A1 | 10/2007 | Griffin | |
| 2009/0143943 A1 | 6/2009 | Jaramillo | |
| 2010/0072772 A1 | 3/2010 | Gamache | |
| 2010/0133891 A1 | 6/2010 | Onoda et al. | |
| 2010/0207773 A1 | 8/2010 | Hayakawa | |
| 2011/0109133 A1 | 5/2011 | Galbreath | |
| 2011/0156453 A1 | 6/2011 | Matsushima | |
| 2011/0215620 A1 | 9/2011 | Cech | |
| 2011/0226751 A1 | 9/2011 | Lazanja | |
| 2012/0299359 A1 | 11/2012 | Abe | |
| 2013/0106147 A1 | 5/2013 | Lazanja | |
| 2013/0127215 A1 | 5/2013 | Dumont | |
| 2013/0193734 A1 | 8/2013 | Pleskot | |
| 2013/0307302 A1 | 11/2013 | Rockwell | |
| 2013/0342335 A1 | 12/2013 | McQueen | |
| 2014/0054944 A1 | 2/2014 | Locke | |
| 2014/0159447 A1 | 6/2014 | Saitou | |
| 2014/0265492 A1 | 9/2014 | Larsen | |
| 2014/0265503 A1 | 9/2014 | Thomas | |
| 2014/0326708 A1 | 11/2014 | Barfuss | |
| 2018/0361890 A1 | 12/2018 | Ishizaka | |
| 2019/0038229 A1 | 2/2019 | Perraut | |
| 2019/0047450 A1 | 2/2019 | Bhatia | |
| 2019/0176663 A1 | 6/2019 | Hoshi et al. | |
| 2019/0300020 A1 | 10/2019 | Alexiou | |
| 2020/0055427 A1 | 2/2020 | Styn | |
| 2020/0223334 A1 | 7/2020 | Parmar | |
| 2020/0391624 A1 | 12/2020 | Onji | |
| 2021/0323443 A1 | 10/2021 | Ozawa et al. | |

FOREIGN PATENT DOCUMENTS

| | | |
|---|---|---|
| JP | S6318152 | 5/1988 |
| JP | H0515225 | 4/1993 |
| JP | 2002022576 A | 1/2002 |
| JP | 2002065396 | 3/2002 |
| JP | 2002326554 | 11/2002 |
| JP | 2003061791 A | 3/2003 |
| JP | 2004050920 | 2/2004 |
| JP | 2005233845 | 9/2005 |
| JP | 2005233904 | 9/2005 |
| JP | 2007-511409 A | 5/2007 |
| JP | 2009208495 | 9/2009 |
| JP | 2010-104570 A | 5/2010 |
| JP | 2011110089 A | 6/2011 |
| JP | 2013014183 | 1/2013 |
| JP | 2013095373 | 5/2013 |
| JP | 2014100943 | 6/2014 |
| JP | 2015141747 | 8/2015 |
| JP | 2016088480 | 5/2016 |
| JP | 2016132448 A | 7/2016 |
| JP | 2016-215402 A | 12/2016 |
| JP | 2017-070633 A | 4/2017 |
| JP | 2017065659 | 4/2017 |
| JP | 2018020714 | 2/2018 |
| JP | 2018024327 A | 2/2018 |
| JP | 2018122747 | 8/2018 |
| JP | 2020059412 A | 4/2020 |
| JP | 2018-051151 A | 5/2020 |
| WO | WO2008043536 | 4/2008 |
| WO | WO 2013/080369 A1 | 6/2013 |

OTHER PUBLICATIONS

Extended European Search Report for corresponding EP Application No. 19857034.3, dated May 12, 2022, 7 pages.
International Search Report for PCT/JP2019/026344 dated Aug. 19, 2019, 2 pages.
Japanese Office Action (w/ English translation) for corresponding Japanese Office Action No. 2018-164256, drafting date Aug. 5, 2022, 10 pages.
Japanese Office Action (w/ English translation) for corresponding Japanese Office Action No. 2018-192290, drafting date Sep. 21, 2022, 17 pages.
Japanese Office Action (with English translation) for corresponding Japanese Application No. 2018-192291, drafting date Sep. 8, 2022, 8 pages.
Japanese Office Action (w/ English translation) for corresponding Japanese Application No. 2018-192290, dated Mar. 22, 2023, 18 pages.
Office Action (w/ English translation) in corresponding JP Application No. 2023-212984, dated Mar. 5, 2025, in 18 pgs.

* cited by examiner

VEHICLE SEAT

CROSS REFERENCE TO RELATED APPLICATIONS

This application is a continuation of U.S. patent application Ser. No. 18/183,412, filed on Mar. 14, 2023, now U.S. Pat. No. 12,005,812 B2, which is, in turn, a continuation of U.S. patent application Ser. No. 17/273,041, filed on Mar. 3, 2021, which is the U.S. National Stage entry of International Application No. PCT/JP2019/026344, filed Jul. 2, 2019, which, in turn, claims priority to Japanese Patent Application No. 2018-164256, filed Sep. 3, 2018; Japanese Patent Application No. 2018-192290, filed Oct. 11, 2018; and Japanese Patent Application No. 2018-192291, filed Oct. 11, 2018, all of which are incorporated herein by reference in their entireties for all purposes.

TECHNICAL FIELD

The present invention relates to a vehicle seat.

BACKGROUND OF THE INVENTION

A vehicle seat having a seat sensor installed in the seat cushion thereof is known (for example, Patent Document 1). The seat sensor is provided with a film-type pressure sensor positioned on the surface (upper surface) of the seat cushion pad. The pressure sensor is a sensor that detects the pressure applied to the seating surface of the seat cushion, and detects that a seat occupant is seated. The pressure sensor is connected to a control unit via a wire harness that is passed through a hole vertically extending through the seat cushion pad and extends to the back surface (lower surface) side of the seat cushion pad. According to this arrangement, the wire harness can be positioned so as not to contact the occupant.

A known seat sensor includes a plurality of pressure-sensitive switches arranged in a seating region of a vehicle seat, and configured to turn on by the seating of an occupant (for example, Patent Document 2). The seat sensor disclosed in Patent Document 2 includes a flexible sheet material, a plurality of pressure-sensitive switches provided on the sheet material, and wiring provided on the sheet material and connected to the pressure-sensitive switches. The pressure-sensitive switches are arranged so as to form a plurality of pairs arranged in the fore and aft direction, each pair containing two pressure-sensitive switches arranged laterally one next to the other and connected in series so as to form an individual sensor unit. The detection circuit becomes conductive and the seat sensor turns on when the two pressure-sensitive switches of at least one of the sensor units are both turned on. Since the sensor units are arranged in the fore and aft direction, the seat sensor is able to detect the seating of an occupant without regard if the occupant is seated on a front part of the seating region or on a rear part of the seating region.

PRIOR ART DOCUMENT(S)

Patent Document(s)

Patent Document 1: JP2017-65659A
Patent Document 1: JP2007-526844A

SUMMARY OF THE INVENTION

Task to be Accomplished by the Invention

However, in the case of a rear seat, since the pads constituting the seat cushion and the seat back are supported by the vehicle body panel, an adequate space cannot be secured on the back side of the pad for placing the wire harness.

In view of such a problem of the prior art, a primary object of the present invention to provide a vehicle seat having a pad supported by a panel which allows wire harness to be placed on the back side of the pad.

Means to Accomplish the Task

To achieve such an object, the present invention provides a vehicle seat (1), comprising: a panel (4); a pad (11, 51) supported by the panel; a skin material (12, 52) covering a front surface of the pad; and a sensor (32) provided between the front surface of the pad and the skin material for acquiring information on a seat occupant, wherein the pad is provided with a through hole (35, 58) passed from the front surface of the pad to a back surface of the pad, and a recess (45, 61) formed in the back surface of the pad and connected to the through hole, the sensor being connected to a wire harness extending in the through hole and the recess.

Thus, in a vehicle seat having a pad supported by a panel, the recess creates a space between the panel and the back surface of the pad so that the wire harness can be placed in this space.

In this invention, preferably, the recess extends from the through hole to an edge of the back surface of the pad.

Thereby, the wire harness positioned on the back surface of the pad can be drawn out to the side part of the pad.

In this invention, preferably, the surface of the panel (5) faces vertically, the pad (11) is placed on an upper surface of the panel so as to be rotatable around a center (X1) located in a rear end portion thereof, and the recess extends rearward from the through hole. Alternatively, the surface of the panel (6) faces in a fore and aft direction, the pad (51) is positioned on a front surface of the panel so as to be rotatable around a center (X2) located in a lower end portion thereof, and the recess extends downward from the through hole.

Since the wire harness extends on the back surface of the pad from the through hole toward the rotation center, the distance between an end of the wire harness and the panel changes very little when the pad rotates relative to the panel so that the wire harness is prevented from being pulled.

In this invention, preferably, the pad includes a plurality of members (14, 15) made of different materials, and the through hole is formed in one of the members.

Thereby, the through hole can be formed with ease.

In this invention, preferably, an air passage (37) extending from the back surface to the front surface is formed in the pad, and the through hole is formed so as to avoid the air passage. Preferably, a locking portion (41) for fixing a child seat is formed on the surface of the pad, and the through hole is formed so as to avoid the locking portion. Further, preferably, a heater cloth (43) having a heater wire is provided on the front surface of the pad, and the through hole is positioned so as to avoid the heater cloth.

Thereby, the interference of other components with the wire harness can be minimized.

In this invention, preferably, one end of the through hole is provided at a position avoiding a pressure receiving area (30) defined as an area on the surface of the pad to which a load of a seat occupant is directly applied. Preferably, the surface of the panel faces vertically, the pad is positioned on an upper surface of the panel, and the through hole is provided behind the pressure receiving area.

Thereby, the load of the occupant is prevented from being applied to the wire harness.

When a plurality of pressure sensors are arranged close to each other on a continuous sheet, a load applied within the detection range of a certain pressure sensor may produce a stress in the sheet so that a deformation of the sheet may be caused, and the other sensors may erroneously detect the load. In view of this fact, another object of the present invention is to prevent such an erroneous detection by the seat sensor.

To achieve such an object, the present invention further provides a seat sensor (110) provided between an upper surface of a seat cushion pad (106) forming a seat cushion (102) of a vehicle seat (101) and a skin material (107) covering the seat cushion pad, comprising: a flexible sheet material (111); a plurality of pressure-sensitive switches (112) provided on the sheet material; and wiring (113) provided on the sheet material and connected to the pressure-sensitive switches provided on the sheet material, wherein the sheet material includes a laterally extending main part (111A) and a plurality of branch parts (111B to 111J) extending forward or rearward from the main part, the pressure-sensitive switches being provided at distal ends of the respective branch parts.

Since each pressure-sensitive switch is connected to the adjacent pressure-sensitive switch via the branch part, the main part, and the branch part, the deformation of any particular branch part caused by the load applied to the pressure-sensitive switch on this branch part is less likely to be transmitted to the branch part on which the adjoining pressure-sensitive switch is located. Therefore, erroneous detection by the adjacent pressure-sensitive switches can be minimized.

In this invention, preferably, the main part extends from a left half of the occupant's seating region (105) to a right half thereof, and the branch parts include a first branch part (111B) and a second branch part (111C) that are positioned in the left half of the seating region laterally spaced apart from each other, and a third branch part (111D) and a fourth branch part (111E) that are positioned in the right half of the seating region laterally spaced apart from each other. Further, the pressure-sensitive switches include a first pressure-sensitive switch (112B) provided at a tip of the first branch part, a second pressure-sensitive switch (112C) provided at a tip of the second branch part, a third pressure-sensitive switch (112D) provided at a tip of the third branch part, and a fourth pressure-sensitive switch (112E) provided at a tip of the fourth branch, and the first to the fourth pressure-sensitive switches are arranged on a first imaginary straight line (L1) extending laterally.

Thus, even when the first to fourth pressure-sensitive switches are arranged close to each other along the lateral direction, erroneous detection of the pressure-sensitive switches can be minimized.

In this invention, preferably, the hip point (HP) of the occupant is located on the first imaginary straight line.

Thereby, the first to fourth pressure-sensitive switches can be arranged in an area where the load of the occupant is most likely to be applied.

In this invention, preferably, the wiring connects the first pressure-sensitive switch and the second pressure-sensitive switch in parallel to each other to form a first circuit (116), connects the third pressure-sensitive switch and the fourth pressure-sensitive switch in parallel to each other to form a second circuit (117), and connects the first circuit and the second circuit in series to each other.

The seat sensor can thereby reliably detect the occupant without regard to the difference in the stature/build of the occupant and the lateral shifting of the occupant's seating position.

In this invention, preferably, the first branch part and the first pressure-sensitive switch are disposed leftward of the second branch part and the second pressure-sensitive switch, and the third branch part and the third pressure-sensitive switch are arranged leftward of fourth branch and the fourth pressure-sensitive switch. Further, the first pressure-sensitive switch is configured to be turned on under a larger load than the second pressure-sensitive switch, and the fourth pressure-sensitive switch is configured to be turned on under a larger load than the third pressure-sensitive switch.

Thereby, the seat sensor is prevented from erroneously detecting an object other than an occupant. More specifically, the laterally outer pressure-sensitive switches, or the first and fourth pressure-sensitive switches, are configured to be turned on under a larger load to detect an occupant of a larger physical stature/build. Since the laterally outer pressure-sensitive switches are thus configured to be turned on under a larger load, these pressure-sensitive switches are prevented from being turned on by an object lighter than a seat occupant.

In this invention, preferably, the first to fourth branch parts extend rearward from the main part, and the branch parts further include a fifth branch part (111F) and a sixth branch part (111G) that extend forward in the left half of the seating region laterally spaced apart from each other, and a seventh branch part (111H) and an eighth branch part (111J) that extend forward in the right half of the seating region laterally spaced apart from each other, and the pressure-sensitive switches include a fifth pressure-sensitive switch (112F) provided at a tip of the fifth branch part, a sixth pressure-sensitive switch (112G) provided at a tip of the sixth branch part, a seventh pressure-sensitive switch (112H) provided at a tip of the seventh branch part; and an eighth pressure-sensitive switch (112J) provided at a tip of the eighth branch part, wherein the fifth to eighth pressure-sensitive switches are arranged on a second imaginary straight line (L2) extending laterally.

By thus forming a rear switch row consisting of the first to fourth pressure-sensitive switches and a front switch row consisting of the fifth to eighth pressure-sensitive switches, the seat occupant can be reliably detected even when the seating position of the occupant is shifted to the front or to the rear.

In this invention, preferably, the wiring connects the fifth pressure-sensitive switch and the sixth pressure-sensitive switch in parallel to each other form a third circuit (118), and the seventh pressure-sensitive switch and the eighth sensor in parallel to each other to form a fourth circuit (119) while the third circuit and the fourth circuit are connected in series to each other, the first circuit and the second circuit being connected in parallel to the third circuit and the fourth circuit.

The front switch row including the fifth to eighth pressure-sensitive switches can reliably detect the seat occupant even when the physical stature/build of the seat occupant varies, or the occupant's seating position shifts in the lateral direction.

In this invention, preferably, the fifth branch part and the fifth pressure-sensitive switch are positioned leftward of the sixth branch part and the sixth pressure-sensitive switch, and the seventh branch part and the seventh pressure-sensitive switch are positioned leftward of the eighth branch part and the eighth pressure-sensitive switch. Further, the fifth pressure-sensitive switch is configured to be turned on under a larger load than the sixth pressure-sensitive switch, and the eighth pressure-sensitive switch is configured to be turned on under a larger load than the seventh pressure-sensitive switch.

The front switch row consisting of the fifth to eighth pressure-sensitive switches are prevented from erroneously detecting an object other than a seat occupant.

In this invention, preferably, the first branch part and the fifth branch part are linearly arranged in a fore and aft direction, the second branch part and the sixth branch part are linearly arranged in the fore and aft direction, the third branch part and the seventh branch part are linearly arranged in the fore and aft direction, and the fourth branch part and the eighth branch part are linearly arranged in the fore and aft direction.

Thereby, the shape of the sheet material can be simplified.

In this invention, preferably, the branch parts include a ninth branch part (111K) extending forward or rearward from the main part and having a connecting portion (114) for connecting to an external wiring at a tip thereof, the connecting portion being positioned behind the second imaginary straight line and forward of the first imaginary straight line.

Thereby, the overall fore and aft width of the seat sensor can be minimized, and the seat sensor can be formed as a compact unit.

In this invention, preferably, the vehicle seat forms a rear seat of an automobile.

In this case, the seat sensor can correctly detect a seat occupant seating on the rear seat where the seating posture of the seat occupant can largely vary.

When an object is placed on the seating surface, pressure is applied to the seating surface, and the pressure is detected by the pressure sensor. Therefore, when only a pressure sensor is used, there may be some difficulty in distinguishing if a seat occupant is seated on the seating surface or an object is placed on the seating surface. Based on this recognition, a primary object of the present invention is to provide a vehicle seat that can distinguish if a seat occupant is seated on the seating surface or an object is placed on the seating surface in a more accurate manner.

To achieve such an object, a certain embodiment of the present invention consists of a vehicle seat (201, 251, 261, 271) including a seat cushion (204) and a seat back (205) provided in a rear part of the seat cushion, the vehicle seat comprising: a pressure sensor (20) provided on the seat cushion; a capacitance sensor (240, 253, 254) provided on at least one of the seat cushion and the seat back, and a determination unit (246) for determining if an occupant is seated according to a signal from the pressure sensor and a signal from the capacitance sensor.

If an occupant is seated or not can be determined from the signal from the pressure sensor and the signal from the capacitance sensor so that the distinction between the seating of an occupant and the placement of an object on the seating surface can be made in a more reliable manner.

In this invention, preferably, the capacitance sensor is provided on the seat back.

Thus, the pressure sensor is provided on the seat cushion, and the capacitance sensor is provided on the seat back. As a result, the pressure sensor and the capacitance sensor can be positioned so as not to interfere with each other without any difficulty, as compared with the case where both the pressure sensor and the capacitance sensor are provided on the seat cushion. Therefore, the two sensors are enabled to operate without any risk of mutual interferences. Also, as compared with the case where both the pressure sensor and the capacitance sensor are provided on the seat cushion, wiring for the pressure sensor and the capacitance sensor can be simplified.

In this invention, preferably, the capacitance sensor is provided at a position corresponding to a hip (H) (lumbar region) of an occupant.

Since the capacitance sensor is positioned so as to be close to the seated occupant, the seating of the occupant can be detected with a higher sensitivity.

In this invention, preferably, the seat cushion is provided with a lateral listing groove (215) extending laterally for receiving a listing strip of the skin material, and the pressure sensor includes a pair of pressure sensors, one placed ahead of the listing groove and the other placed behind the listing groove.

Thereby, the assembling of the pressure sensors is facilitated. Also, deformation and displacement of the pressure sensors can be avoided. Further, by placing the pressure sensors ahead of and behind the laterally extending listing groove, the pressure applied to the seating surface of the seat cushion can be detected over a wider range.

In this invention, preferably, the seat back is provided with a pair of longitudinal listing grooves (236) each for receiving a listing strip of the skin material, and the capacitance sensor is provided between the left and right longitudinal listing grooves.

Thereby, the assembling of the capacitance sensor is facilitated. Further, deformation and displacement of the capacitance sensor can be minimized.

In this invention, preferably, both the pressure sensor and the capacitance sensor (253, 254) are provided on the seat cushion.

Thus, the capacitance sensor is provided on the seat cushion on which the occupant sits. Therefore, the capacitance sensor is positioned close to the seating surface with which the occupant comes into contact when seated so that the occupant can be detected by the capacitance sensor with an increased sensitivity.

In this invention, preferably, the pressure sensor and the capacitance sensor are positioned so as to at least partly overlap with each other in top view.

Thereby, the area of the seating surface occupied by the pressure sensor and the capacitance sensor can be minimized so that the discomfort that may be caused to the occupant due to the presence of the pressure sensor and the capacitance sensor can be minimized.

In this invention, preferably, the pressure sensor is positioned on top of the capacitance sensor in such a manner that the pressure sensor is located within an outer periphery of the capacitance sensor in top view.

Thereby, the area of the seating surface occupied by the pressure sensor and the capacitance sensor can be minimized so that the discomfort that may be caused to the occupant due to the presence of the pressure sensor and the capacitance sensor can be minimized.

In this invention, preferably, the seat cushion is provided with a lateral listing groove (215) extending laterally for receiving a listing strip of the skin material, and the capacitance sensor includes a pair of capacitance sensors, one positioned ahead of the lateral listing groove, and the other positioned behind the lateral listing groove, the pressure sensor including a pair of pressure sensors, one placed on top of one of the capacitance sensors, and the other placed on top of the other capacitance sensor.

Since the pressure sensors and the capacitance sensors are located ahead of and behind the lateral listing groove, the pressure applied to the seating surface of the seat cushion can be detected over a wider range. Since the pressure sensors and the capacitance sensors are located so as to avoid the lateral listing groove, the assembling of the pressure sensors to the seat cushion is facilitated, and the deformation and the displacement of these sensors when an occupant is seated can be minimized.

In this invention, preferably, the seat cushion is provided with a lateral listing groove (215) extending laterally for receiving a listing strip of the skin material, and the pressure sensor is positioned behind the lateral listing groove, and the capacitance sensor is positioned ahead of the lateral listing groove.

Since the pressure sensors and the capacitance sensors are both located close to the seating surface, the seating of an occupant can be detected with a high sensitivity. Since the pressure sensors and the capacitance sensors are located so as to avoid the lateral listing groove, the assembling of the pressure sensors to the seat cushion is facilitated. Further, the deformation and the displacement of these sensors when an occupant is seated can be minimized.

In this invention, preferably, the capacitance sensor is provided with an opening (263, 264) passed vertically therethrough, and positioned on the seat cushion, and the pressure sensor is positioned inside the opening.

Since the pressure sensor is positioned inside the opening of the capacitance sensor, the seating surface can be made more even so that the seating comfort can be improved.

In this invention, preferably, the upper surface of the pressure sensor and the upper surface of the capacitance sensor are flush with each other.

Thereby, the seating surface becomes more even so that the seating comfort can be further improved.

In this invention, preferably, the seat cushion is provided with a lateral listing groove (215) extending laterally for receiving a listing strip of the skin material, and the capacitance sensor includes a pair of capacitance sensors, one positioned ahead of the lateral listing groove and the other positioned behind the lateral listing groove, the pressure sensors being positioned in the openings of the capacitance sensors, respectively.

Since the pressure sensors and the capacitance sensors are positioned ahead of and behind the lateral listing groove, the seating of an occupant on the seating surface can be detected over a wider range. Since the pressure sensors and the capacitance sensors are located so as to avoid the lateral listing groove, the assembling of the pressure sensors and the capacitance sensors to the seat cushion is facilitated. Since the pressure sensors are positioned inside the openings of the capacitance sensors, respectively, the seating surface can be made more even so that the seating comfort can be improved.

Effect of the Invention

According to the embodiment of the present invention which was mentioned earlier, in a vehicle seat having a pad supported by the panel, the recess creates a space between the panel and the back surface of the pad so that the wire harness can be placed in this space.

When the recess extends from the through hole to an edge of the back surface of the pad, the wire harness positioned on the back surface of the pad can be drawn out to the side part of the pad.

According to the embodiment in which the surface of the panel faces vertically, the pad is placed on an upper surface of the panel so as to be rotatable around a center located in a rear end portion thereof, and the recess extends rearward from the through hole, or alternatively, the surface of the panel faces in a fore and aft direction, the pad is disposed on a front surface of the panel so as to be rotatable around a center located in a lower end portion thereof, and the recess extends downward from the through hole, the distance between the end of the wire harness and the panel changes very little when the pad rotates relative to the panel so that the wire harness is prevented from being pulled.

When the pad includes a plurality of members made of different materials, and the through hole is formed in one of the members, the through hole can be formed with ease.

According to an embodiment in which an air passage extending from the back surface to the front surface is formed in the pad, and the through hole is formed so as to avoid the air passage, a locking portion for fixing a child seat is formed on the surface of the pad, and the through hole is formed so as to avoid the locking portion, or a heater cloth having a heater wire is provided on the front surface of the pad, and the through hole opens at a position avoiding the heater cloth, the interference of other components with the wire harness can be minimized.

According to an embodiment in which one end of the through hole is provided at a position avoiding a pressure receiving area defined as an area on the surface of the pad to which a load of a seat occupant is directly applied or, the surface of the panel faces vertically, the pad is positioned on the upper surface of the panel, and the through hole is provided behind the pressure receiving area, the load of the occupant is prevented from being applied to the wire harness.

When the sheet material includes a laterally extending main part and a plurality of branch parts extending forward or rearward from the main part, the pressure-sensitive switches being provided at distal ends of the respective branch parts, since each pressure-sensitive switch is connected to the adjacent pressure-sensitive switch via the branch part, the main part, and the branch part, the deformation of any particular branch part caused by the load applied to the pressure-sensitive switch on this branch part is less likely to be transmitted to the branch part on which the adjoining pressure-sensitive switch is located, erroneous detection by the adjacent pressure-sensitive switches can be minimized.

When the branch parts include a first branch part and a second branch part that are positioned in the left half of the seating region laterally spaced apart from each other, and a third branch part and a fourth branch part that are positioned in the right half of the seating region laterally spaced apart from each other, and the first to the fourth pressure-sensitive switches are arranged on a first imaginary straight line extending laterally, even when the first to fourth pressure-sensitive switches are arranged close to each other along the lateral direction, erroneous detection of the pressure-sensitive switches can be minimized.

When the hip point of the occupant is located on the first imaginary straight line, the first to fourth pressure-sensitive switches can be arranged in an area where the load of the occupant is most likely to be applied.

When the wiring connects the first pressure-sensitive switch and the second pressure-sensitive switch in parallel to each other to form a first circuit, connects the third pressure-sensitive switch and the fourth pressure-sensitive switch in parallel to each other to form a second circuit, and connects the first circuit and the second circuit in series to each other, the seat sensor can reliably detect the occupant without regard to the difference in the stature/build of the occupant and the lateral shifting of the occupant's seating position.

When the first pressure-sensitive switch is configured to be turned on under a larger load than the second pressure-sensitive switch, and the fourth pressure-sensitive switch is configured to be turned on under a larger load than the third pressure-sensitive switch, the seat sensor is prevented from erroneously detecting an object other than an occupant. Since the laterally outer pressure-sensitive switches are thus configured to be turned on under a larger load, these pressure-sensitive switches are prevented from being turned on by an object lighter than a seat occupant.

The branch parts may further include a fifth branch part and a sixth branch part that extend forward in the left half of the seating region laterally spaced apart from each other, and a seventh branch part and an eighth branch part that extend forward in the right half of the seating region laterally spaced apart from each other, and the fifth to the eighth pressure-sensitive switches may be arranged on a second imaginary straight line extending laterally. By thus forming the rear switch row consisting of the first to fourth pressure-sensitive switches and the front switch row consisting of the fifth to eighth pressure-sensitive switches, the seat occupant can be reliably detected even when the seating position of the occupant is shifted to the front or to the rear.

When the wiring connects the fifth pressure-sensitive switch and the sixth pressure-sensitive switch in parallel to each other to form a third circuit, and the seventh pressure-sensitive switch and the eighth sensor in parallel to each other to form a fourth circuit while the third circuit and the fourth circuit are connected in series to each other, the first circuit and the second circuit being connected in parallel to the third circuit and the fourth circuit, the front switch row including the fifth to eighth pressure-sensitive switches can reliably detect the seat occupant even when the physical stature/build of the seat occupant varies, or the occupant's seating position shifts in the lateral direction.

When the fifth pressure-sensitive switch is configured to be turned on under a larger load than the sixth pressure-sensitive switch, and the eighth pressure-sensitive switch is configured to be turned on under a larger load than the seventh pressure-sensitive switch, the front switch row consisting of the fifth to eighth pressure-sensitive switches are prevented from erroneously detecting an object other than a seat occupant.

When the first branch part and the fifth branch part are linearly arranged in a fore and aft direction, the second branch part and the sixth branch part are linearly arranged in the fore and aft direction, the third branch part and the seventh branch part are linearly arranged in the fore and aft direction, and the fourth branch part and the eighth branch part are linearly arranged in the fore and aft direction, the shape of the sheet material can be simplified.

When the connecting portion provided at the tip of the ninth branch part is positioned behind the second imaginary straight line and forward of the first imaginary straight line, the overall fore and aft width of the seat sensor can be minimized, and the seat sensor can be formed as a compact unit.

When the vehicle seat forms a rear seat of an automobile, the seat sensor can correctly detect a seat occupant seating on the rear seat where the seating posture of the seat occupant can largely vary.

When the vehicle seat comprises a pressure sensor provided on the seat cushion, a capacitance sensor provided on at least one of the seat cushion and the seat back, and a determination unit for determining if an occupant is seated according to a signal from the pressure sensor and a signal from the capacitance sensor, the distinction between the seating of an occupant and the placement of an object on the seating surface can be made in a more reliable manner.

In this embodiment, when the capacitance sensor is provided on the seat back, the pressure sensor and the capacitance sensor can be positioned so as not to interfere with each other without any difficulty, as compared with the case where both the pressure sensor and the capacitance sensor are provided on the seat cushion. Also, as compared with the case where both the pressure sensor and the capacitance sensor are provided on the seat cushion, wiring for the pressure sensor and the capacitance sensor can be simplified.

In this embodiment, when the capacitance sensor is provided at a position corresponding to a hip of an occupant, since the capacitance sensor is positioned so as to be close to the seated occupant, the seating of the occupant can be detected with a higher sensitivity.

In this embodiment, when the seat cushion is provided with a lateral listing groove extending laterally for receiving a listing strip of the skin material, and the pressure sensor includes a pair of pressure sensors, one placed ahead of the listing groove and the other placed behind the listing groove, the assembling of the pressure sensors is facilitated. Also, deformation and displacement of the pressure sensors can be avoided. Further, by placing the pressure sensors ahead of and behind the laterally extending listing groove, respectively, the pressure applied to the seating surface of the seat cushion can be detected over a wider range.

In this embodiment, when the seat back is provided with a pair of longitudinal listing grooves each for receiving a listing strip of the skin material, and the capacitance sensor is provided between the left and right longitudinal listing grooves, the assembling of the capacitance sensor is facilitated. Further, deformation and displacement of the capacitance sensor can be minimized.

In this embodiment, when both the pressure sensor and the capacitance sensor are provided on the seat cushion, the capacitance sensor is positioned close to the seating surface with which the occupant comes into contact when seated so that the occupant can be detected by the capacitance sensor with an increased sensitivity.

In this embodiment, when the pressure sensor and the capacitance sensor are positioned so as to at least partly overlap with each other in top view, the area of the seating surface occupied by the pressure sensor and the capacitance sensor can be minimized so that the discomfort that may be caused to the occupant due to the presence of the pressure sensor and the capacitance sensor can be minimized.

In this embodiment, when the pressure sensor is positioned on top of the capacitance sensor in such a manner that the pressure sensor is located within an outer periphery of the capacitance sensor in top view, the area of the seating surface occupied by the pressure sensor and the capacitance sensor can be minimized so that the discomfort that may be caused to the occupant due to the presence of the pressure sensor and the capacitance sensor can be minimized.

In this embodiment, when the seat cushion is provided with a lateral listing groove extending laterally for receiving a listing strip of the skin material, and the capacitance sensor includes a pair of capacitance sensors, one positioned ahead of the lateral listing groove, and the other positioned behind the lateral listing groove, the pressure sensor including a pair of pressure sensors, one placed on top of one of the capacitance sensors, and the other placed on top of the other capacitance sensor, since the pressure sensors and the capacitance sensors are located ahead of and behind the lateral listing groove, the pressure applied to the seating surface of the seat cushion can be detected over a wider range. Since the pressure sensors and the capacitance sensors are located so as to avoid the lateral listing groove, the assembling of the pressure sensors to the seat cushion is facilitated, and the deformation and the displacement of these sensors when an occupant is seated can be minimized.

In this embodiment, when the seat cushion is provided with a lateral listing groove extending laterally for receiving a listing strip of the skin material, and the pressure sensor is positioned behind the lateral listing groove, and the capacitance sensor is positioned ahead of the lateral listing groove, since the pressure sensor and the capacitance sensor are both located close to the seating surface, the seating of an occupant can be detected with a high sensitivity. Since the pressure sensor and the capacitance sensor are located so as to avoid the lateral listing groove, the assembling of the pressure sensors to the seat cushion is facilitated. Further, the deformation and the displacement of these sensors when an occupant is seated can be minimized.

In this embodiment, when the capacitance sensor is provided with an opening passed vertically therethrough, and placed in the seat cushion, and the pressure sensor is positioned inside the opening, since the pressure sensor is positioned inside the opening of the capacitance sensor, the seating surface can be made more even so that the seating comfort can be improved.

In this embodiment, when the upper surface of the pressure sensor and the upper surface of the capacitance sensor are flush with each other, the seating surface becomes more even so that the seating comfort can be further improved.

In this embodiment, when the seat cushion is provided with a lateral listing groove extending laterally for receiving a listing strip of the skin material, and the capacitance sensor includes a pair of capacitance sensors, one positioned ahead of the lateral listing groove and the other positioned behind the lateral listing groove, the pressure sensors being positioned in the openings of the capacitance sensors, respectively, since the pressure sensors and the capacitance sensors are positioned ahead of and behind the lateral listing groove, the seating of an occupant on the seating surface can be detected over a wider range. Since the pressure sensors and the capacitance sensors are located so as to avoid the lateral listing groove, the assembling of the pressure sensors and the capacitance sensors to the seat cushion is facilitated. Since the pressure sensors is positioned inside the openings of the capacitance sensors, respectively, the seating surface can be made more even so that the seating comfort can be improved.

DETAILED DESCRIPTION OF THE PREFERRED EMBODIMENT(S)

First Embodiment

A vehicle seat as applied to a rear seat of an automobile according to a first embodiment of the present invention is described in the following with reference to the appended drawings. In the following description, the left and right directions are defined from the viewpoint of an occupant seated on the seat.

Figure 1:
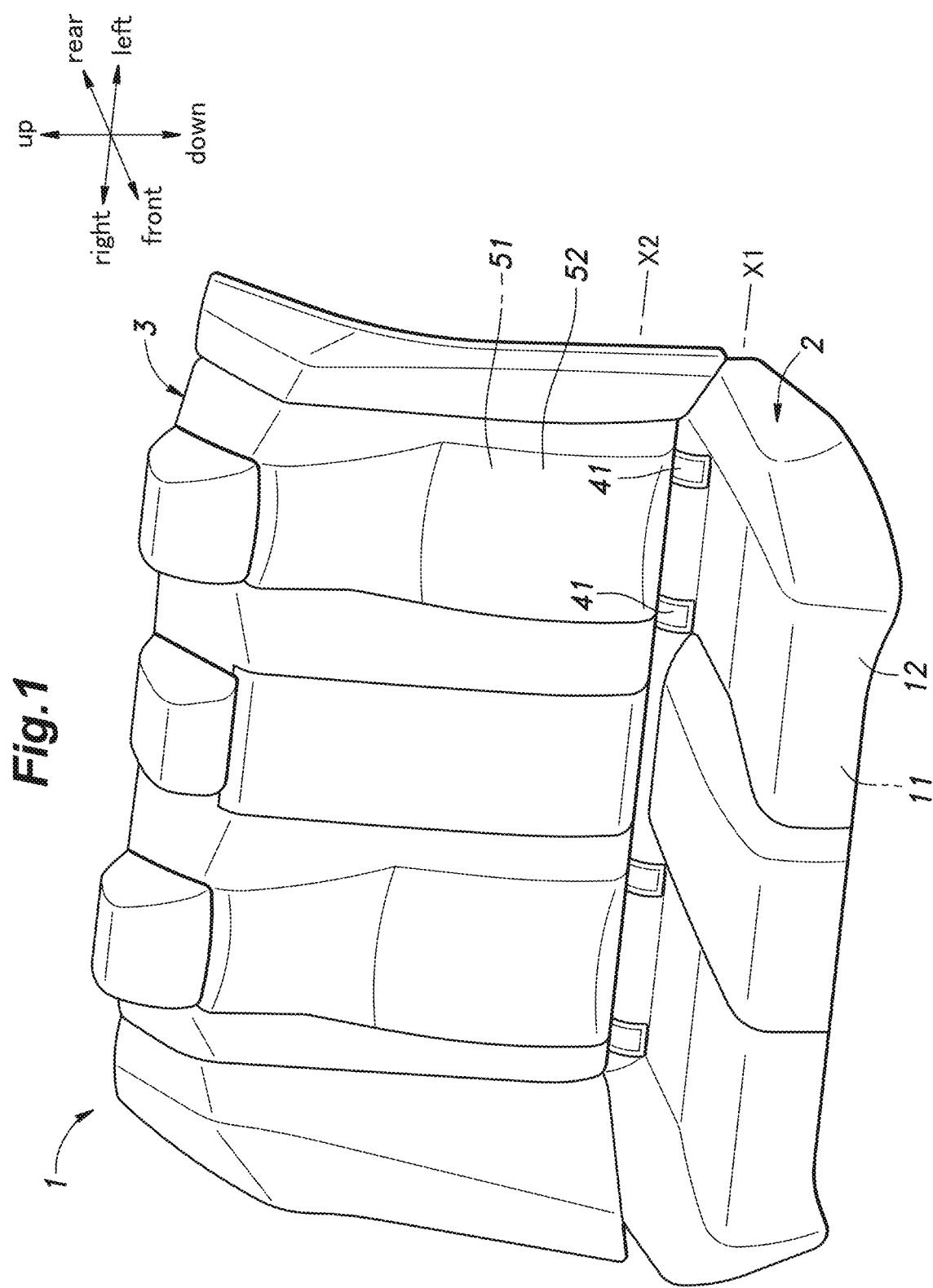
FIG. 1 is a perspective view of a seat according to a first embodiment of the present invention.
Figure 2:
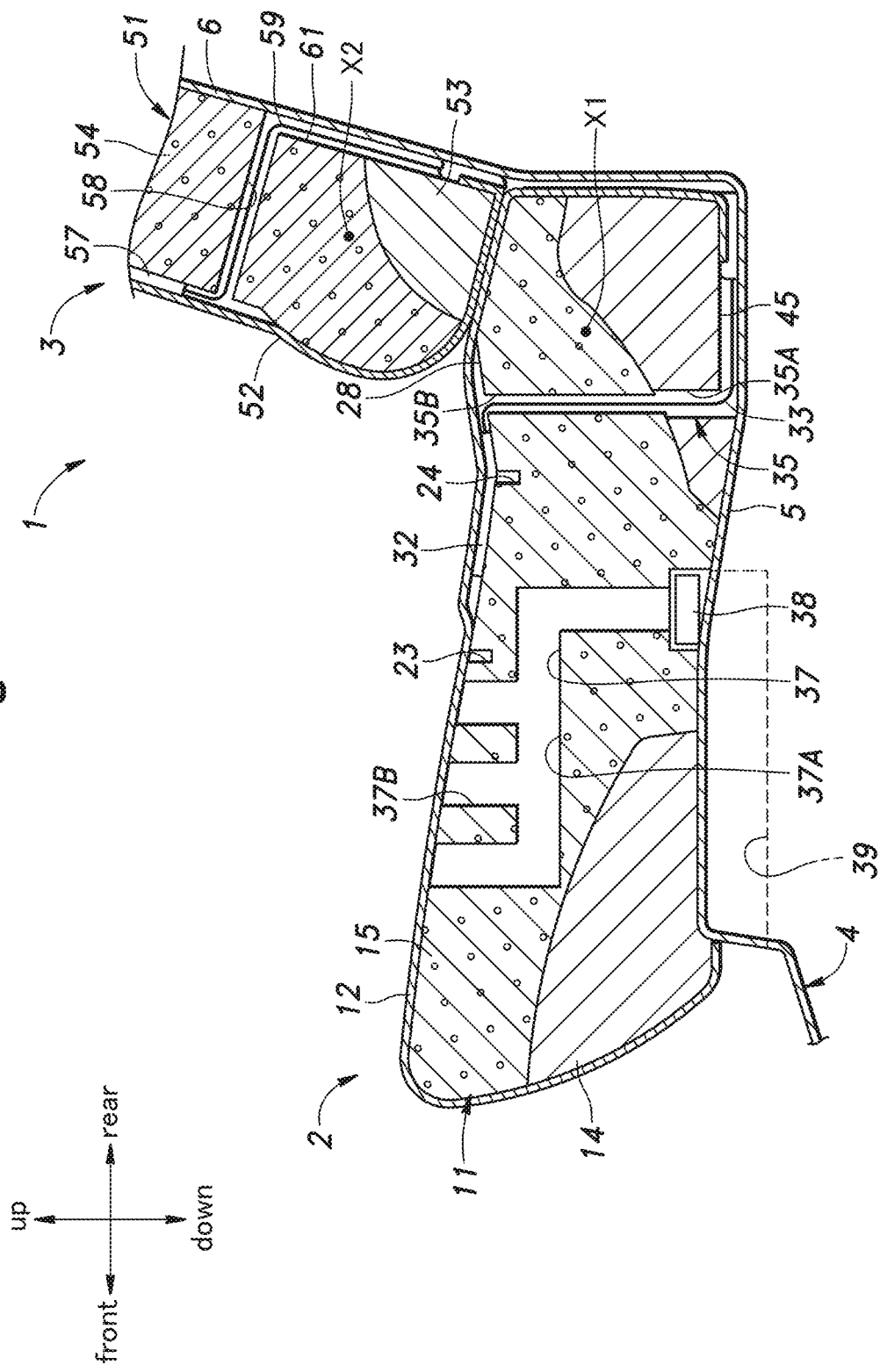
FIG. 2 is a sectional view of a seat cushion pad of the first embodiment.

As shown in FIG. 1, the seat 1 is a bench seat on which three people can be seated. The seat 1 is provided with a seat cushion 2 and a seat back 3 extending upward from a rear end of the seat cushion 2. As shown in FIG. 2, the seat 1 is supported by a vehicle body panel 4 which forms a vehicle body of the automobile. The vehicle body panel 4 is formed by stamp-forming steel sheet, and has a floor portion 5 having a vertically facing surface, and a wall portion 6 which extends upward from the rear edge of the floor portion 5 and has a surface facing in the fore and aft direction. The wall portion 6 separates a cabin and a luggage space from each other. The seat cushion 2 is supported on the upper surface of the floor portion 5, and the seat back 3 is supported on the front surface of the wall portion 6.

Figure 3:
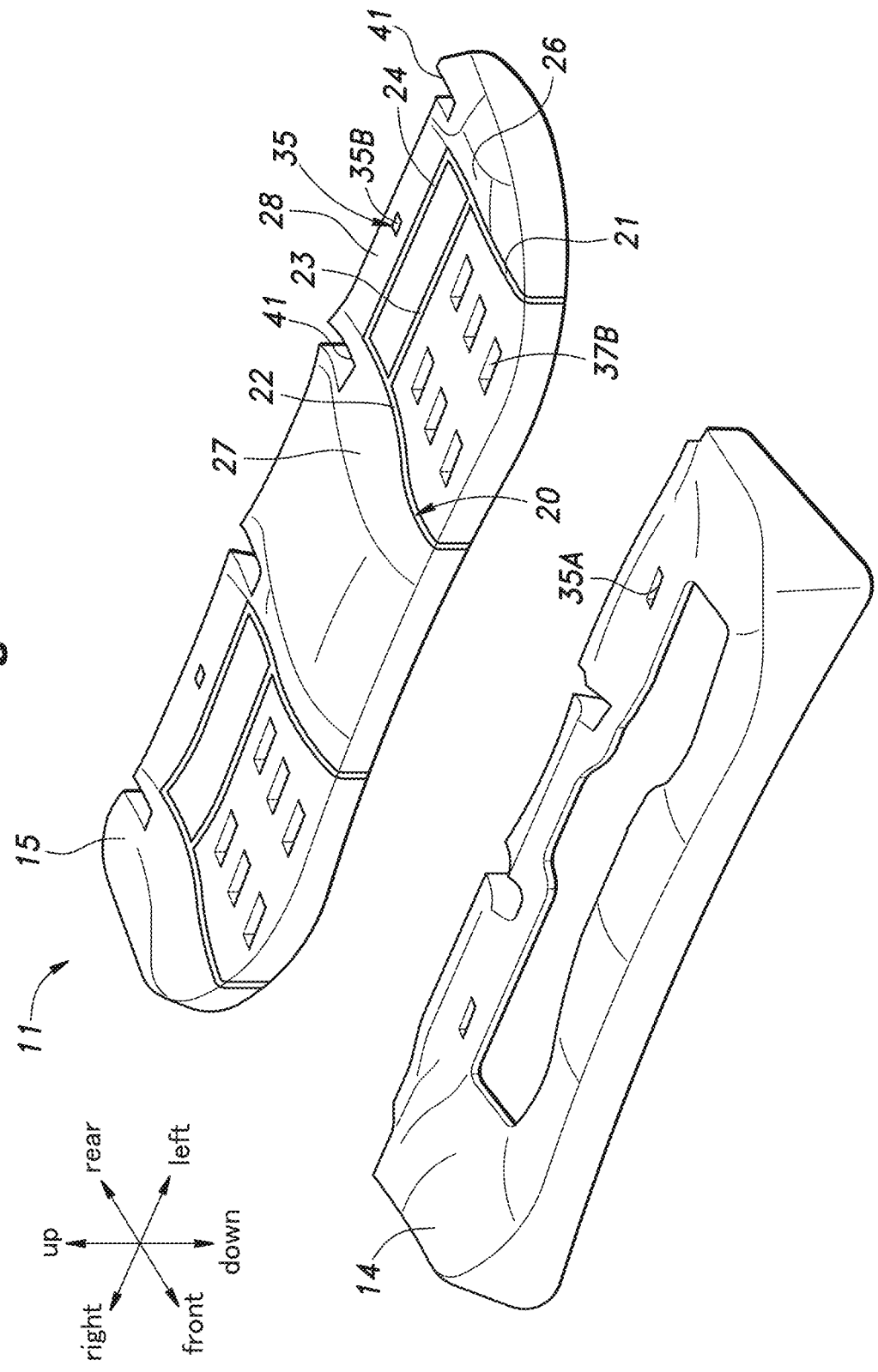
FIG. 3 is an exploded perspective view of the seat cushion pad of the first embodiment.

The seat cushion 2 includes a seat cushion pad 11 supported by the floor portion 5 and a skin material 12 that covers a front surface (upper surface) of the seat cushion pad 11. As shown in FIGS. 2 and 3, the seat cushion pad 11 is formed by combining a plurality of members made of different materials. The seat cushion pad 11 has a rigid part 14 that forms the outer periphery of the back part (lower part) thereof, and a soft part 15 that forms the front part (upper part) thereof and the central part of the lower part thereof. The soft part 15 has a higher flexibility than the rigid part 14 and is connected to the rigid part 14. The rigid part 14 is, for example, EPP (foamed polypropylene), and the soft part 15 is, for example, urethane foam. Due to the structure in which the soft part 15 is supported by the rigid part 14, the shape of the seat cushion pad 11 can be maintained. In another embodiment, in order to maintain the shape of the seat cushion pad 11, a reinforcing material such as wire is provided inside at least one of the soft part 15 and the rigid part 14. Optionally, a frame structure may be provided for supporting the soft part 15.

The seat cushion pad 11 is rotatably supported by the floor portion 5 about a rotational axis X1 extending laterally at the rear end thereof. The seat cushion pad 11 is preferably rotatably supported by a bracket provided on the floor portion 5. The seat cushion pad 11 can rotate about the rotational axis X1 between a normal position where the back surface (lower surface) thereof contacts the upper surface of the floor portion 5 to allow an occupant to be seated thereon, and a tip-up position where the front part thereof is moved upward from the normal position. In the normal position, the front end of the seat cushion pad 11 may be locked to the floor portion 5.

Figure 4:
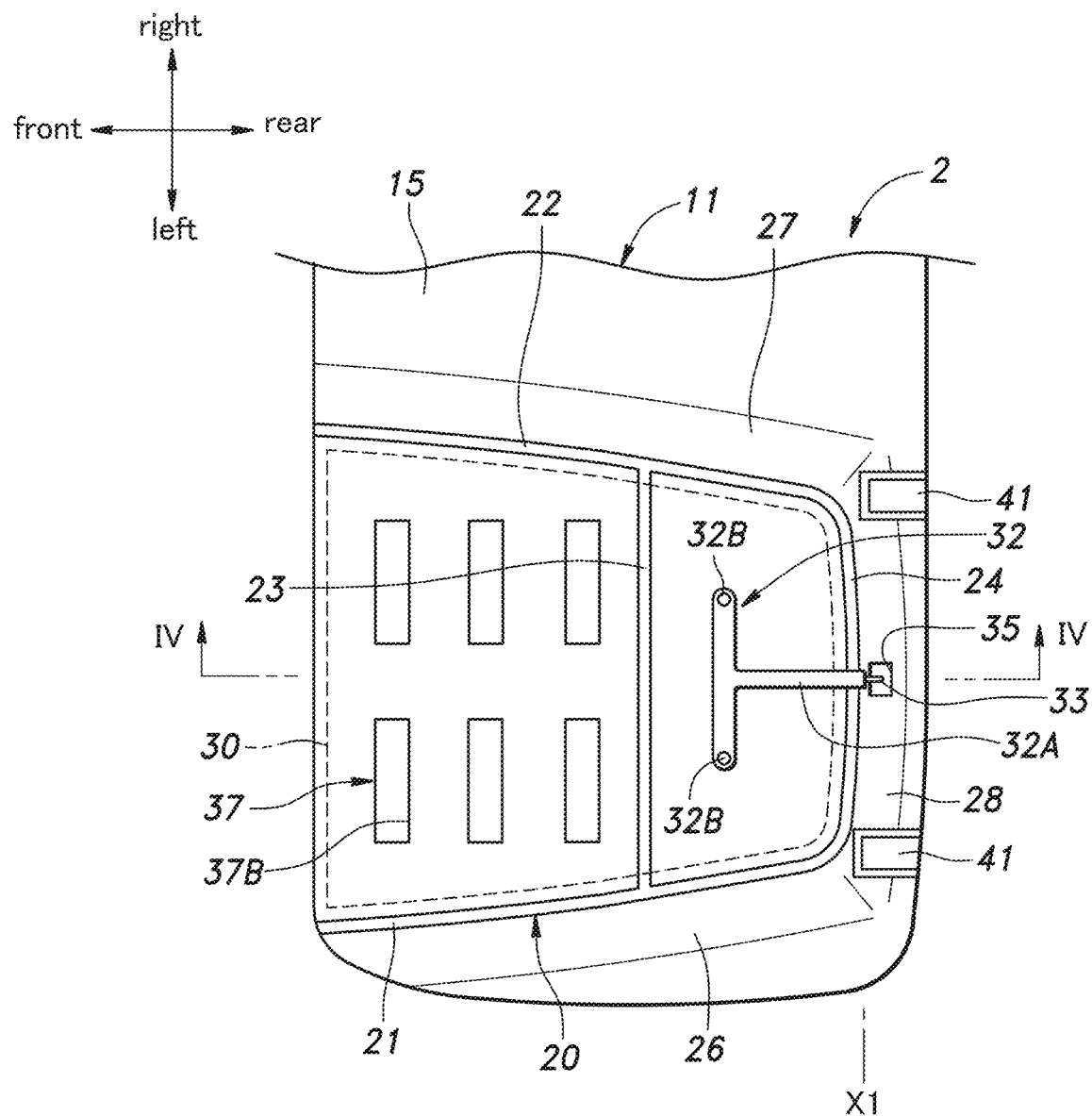
FIG. 4 is a plan view of the seat cushion pad of the first embodiment.

As shown in FIGS. 3 and 4, a listing groove 20 for receiving listing strips of the skin material 12 is formed on the surface (upper surface) of the seat cushion pad 11. A wire for engaging hooks of the listing strips provided on the back surface of the skin material 12 is provided in each section of the listing groove 20. Each wire is embedded in the soft part 15 and is exposed outside in the listing groove 20. The listing groove 20 formed in a left part of the surface of the seat cushion pad 11 corresponding to the left seat includes a pair of longitudinal grooves 21 and 22 provided on either side thereof and a pair of lateral grooves 23 and 24 provided on in a front part and a rear part thereof, respectively.

The left and right longitudinal grooves 21 and 22 extend in the fore and aft direction in a laterally spaced relationship in parallel to each other. The spacing between the left and right longitudinal grooves 21 and 22 is preferably larger than the distance between the hip joints of a general adult male. The front ends of the left and right longitudinal grooves 21 and 22 reach the front edge of the seat cushion pad 11. The front lateral groove 23 extends laterally at a position ahead of the hip joints of the occupant in the proper sitting position, and is connected to the left and right longitudinal grooves 21 and 22. The front lateral groove 23 is provided at a central part of the surface of the seat cushion pad 11 with respect to the fore and aft direction. The rear lateral groove 24 extends laterally at a position behind the hip joints of the seated occupant in the proper seating position, and is connected to the left and right longitudinal grooves 21 and 22. The rear lateral groove 24 is provided at a position of the surface of the seat cushion pad 11 in a range of 10% to 30% of the entire longitudinal length from the rear edge with respect to the fore and aft direction.

The surface of the seat cushion pad 11 includes a left inclined portion 26 inclining upward from the left longitudinal groove 21 toward the left end thereof, and a right inclined portion 17 inclining upward from the right longitudinal groove 22 toward the right end thereof, and a rear inclined portion 28 inclining upward from the rear lateral groove 24 toward the rear end thereof. An area on the surface of the seat cushion pad 11 to which the load of the occupant is directly applied is defined as a pressure receiving area 30. In the present embodiment, the pressure receiving area 30 corresponds to a region surrounded by the left and right longitudinal grooves 21 and 22 and the rear lateral groove 24.

As shown in FIGS. 2 and 4, a sensor 32 is positioned between the front surface of the seat cushion pad 11 and the skin material 12 for acquiring information on the seat occupant. The sensor 32 may include a load sensor (pressure sensor) for detecting the load of the seated person, a blood pressure sensor for detecting the blood pressure of the seated person, a pulse sensor for detecting the pulse of the seated person, a sweat sensor for detecting the sweat of the seated person, an odor sensor that detects the odor of the seated person, a body temperature sensor that detects the body temperature of the seated person, or the like. The sensor 32 is preferably formed in a film shape, and preferably extends along the front surface of the seat cushion pad 11.

In the present embodiment, the sensor 32 consists of a load sensor that detects the load of the seat occupant. The sensor 32 includes a flexible film 32A and thin film-like detection units 32B provided on the film 32A. The detection units 32B may each consist of, for example, a piezoelectric element or a thin film switch in which two metal plates are placed opposite to each other with a gap therebetween, so that when a load is applied, the two metal plates bend and come into contact with each other to conduct. The film 32A is provided along the front surface of the seat cushion pad 11. The film 32A extends from the pressure receiving area 30 to the rear inclined portion 28, and passes over the lateral groove 24 on the rear side. The skin material 12 is pulled into the rear lateral groove 24 on either lateral side of the film 32A in order to avoid interference with the film 32A. The front end of the film 32A is branched and extends to in both the leftward and rightward directions. The detection units 32B are provided at the left and right ends of the front end of the film 32A, respectively, and are positioned in the pressure receiving area 30. The film 32A is provided with signal lines extending from the detection units 32B. The film 32A may be a flexible printed circuit board or the like. A wire harness 33 for transmitting the detection signal from the detection units 32B is connected to a rear end part of the film 32A of the sensor 32.

A harness passage 35 is formed in the seat cushion pad 11 as a through hole passed therethrough from the front surface to the back surface. The wire harness 33 connected to the sensor 32 extends from the front side of the seat cushion pad 11 to the back side of the seat cushion pad 11 through the wire harness passage 35. The open end of the wire harness passage 35 on the front surface side is provided at a position avoiding the pressure receiving area 30. In the present embodiment, the open end of the wire harness passage 35 on the front surface side is provided in the rear inclined portion 28. The wire harness passage 35 may be formed only in the soft part 15, or may be formed in the soft part 15 and the rigid part 14. By forming the wire harness passage 35 only in the soft part 15 while avoiding the rigid part 14, the forming process for the wire harness passage 35 is facilitated. In the present embodiment, the wire harness passage 35 extends vertically and is passed through both the soft part 15 and the rigid part 14 so that the open end on the back surface side is formed in the rigid part 14. The diameter of the part 35A of the wire harness passage 35 formed in the rigid part 14 is larger than the diameter of the part 35B of the wire harness passage 35 formed in the soft part 15. Thus, the wire harness passage 35 consists of a stepped hole in which the diameter of the part 35A of the wire harness passage 35 on the back surface side is increased stepwise with respect to the part 35B of the wire harness passage 35 on the front surface side. In another embodiment, the wire harness passage 35 may extend obliquely with respect to the vertical direction. By causing the wire harness passage 35 to extend obliquely, the wire harness passage 35 can be formed only in the soft part 15 while avoiding the rigid part 14.

An air passages 37 extends in the seat cushion pad 11 from the back surface thereof to the front surface thereof. The air passage 37 includes a collecting portion 37A opening on the back surface of the seat cushion pad 11, and a branch part 37B branched from the collecting portion 37A and opening on the front surface. A blower 38 is provided at the open end of the collecting portion 37A. A ventilation groove 39 is formed in the floor portion 5 of the vehicle body panel 4 at a position corresponding to the open end of the collecting portion 37A. The ventilation groove 39 extends in the fore and aft direction, and communicates with the open end of the collecting portion 37A at the rear end thereof, and communicates with the internal space of the cabin at the front end thereof. The skin material 12 has air permeability. As the blower 38 rotates, the air drawn from the passenger compartment flows through the ventilation groove 39, the collecting portion 37A, and the branch part 37B in that order, and passes through the skin material 12. The air is then discharged upward from the seat cushion 2. The wire harness passage 35 is formed so as to avoid the air passage 37. In another embodiment, the wire harness passage 35 at least partly overlaps with the air passage 37. The ventilation groove 39 may be formed on the back surface of the seat cushion pad 11 by suitably recessing the corresponding part thereof, instead of the floor portion 5.

A rear end part of the front surface of the seat cushion pad 11 is provided with a pair of locking portions 41 for securing child seats laterally one next to the other. Each locking portion 41 includes a groove formed in the seat cushion pad 11 and a striker placed inside the groove. The locking portions 41 may be configured to comply with the international standard ISO-FIX. The wire harness passage 35 is formed so as to avoid the respective locking portions 41.

Figure 5:
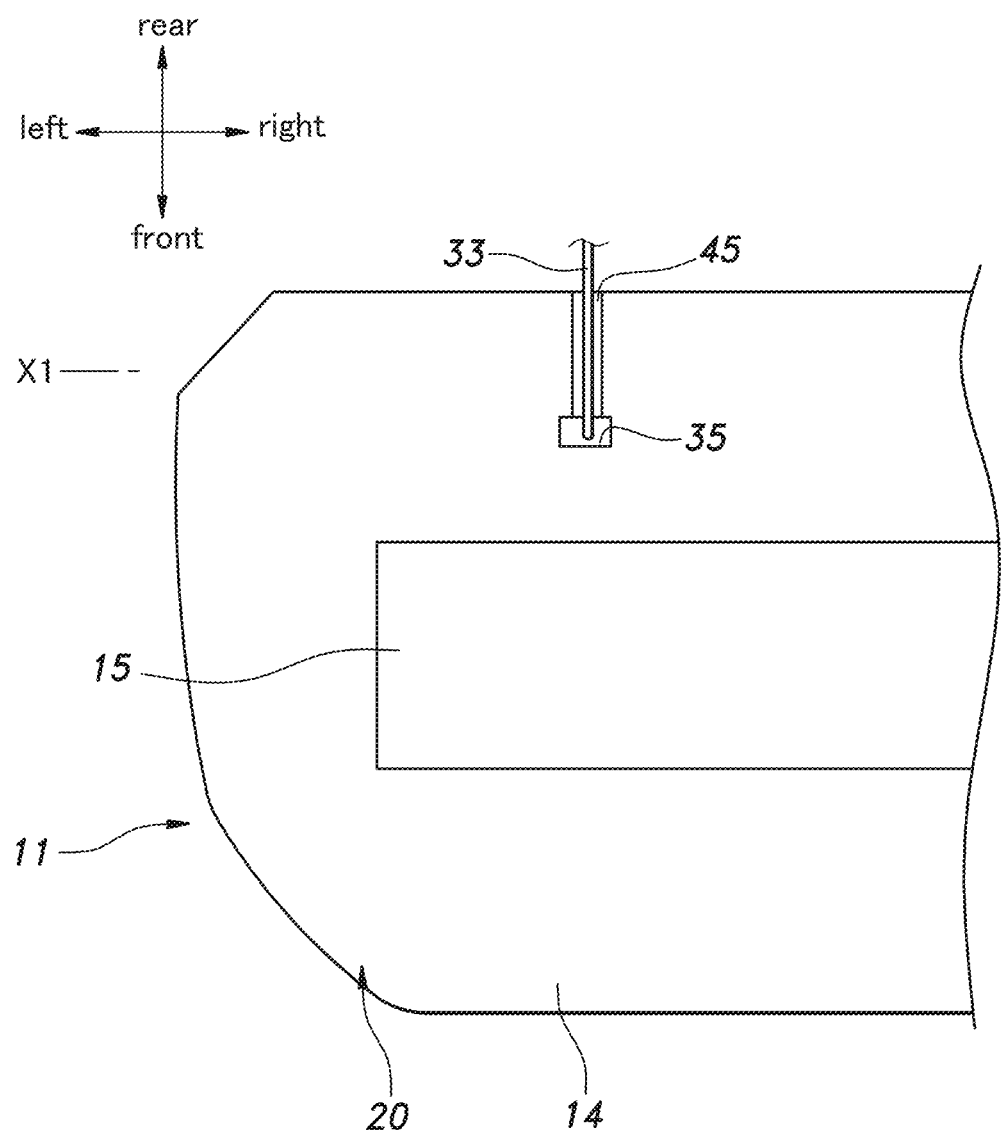
FIG. 5 is a bottom view of the seat cushion pad of the first embodiment.

As shown in FIGS. 2 and 5, the back surface of the seat cushion pad 11 is provided with a recess 45 connected to the open end of the wire harness passage 35 on the back surface side of the seat cushion pad 11. The recess 45 and the floor portion 5 of the vehicle body panel 4 jointly form a space for receiving the wire harness 33 therein. The recess 45 has a groove shape and extends rearward from the wire harness passage 35. More specifically, the recess 45 extends from the wire harness passage 35 toward the side of the rotational axis X1 of the seat cushion pad 11. The rear end of the recess 45 may reach the rear edge of the seat cushion pad 11. The recess 45 may be dimensioned so as to receive an electronic component such as a connector of the wire harness 33 or a microcomputer to which the wire harness 33 is connected.

The wire harness 33 extends rearward from the sensor 32 provided on the front surface of the seat cushion pad 11 along the front surface of the seat cushion pad 11, reaches the back side of the seat cushion pad 11 via the wire harness passage 35, and then extends to the rear edge of the seat cushion pad 11 via the recess 45.

As shown in FIG. 2, the seat back 3 includes a seat back pad 51 supported by the wall portion 6 of the vehicle body panel 4, and a skin material 52 covering a surface (front surface) of the seat back pad 51. The seat back pad 51 has a rigid part 53 and a soft part 54, similarly to the seat cushion pad 11.

The seat back pad 51 is rotatably supported at the lower end thereof by the wall portion 6 about a rotational axis X2 extending laterally. The seat back pad 51 may be supported by a bracket provided on the wall portion 6 so as to be rotatable around the rotational axis X2. The seat back pad 51 rotates about the rotational axis X2 between a normal position in which the back surface (rear surface) is in contact with the front surface of the wall portion 6, and a forward tilt position in which the upper portion of the seat back pad 51 is positioned forward with respect to the normal position. In the normal position, the upper end of the seat back pad 51 is preferably locked to the wall portion 6. In another embodiment, the seat back pad 51 is rotatably supported by the seat cushion pad 11 instead of the wall portion 6.

A listing groove is formed on the surface of the seat back pad 51, similarly to the seat cushion pad 11. A sensor 57 is placed between the front surface of the seat back pad 51 and the skin material 52 for acquiring information on the occupant. The sensor 57 may be similar to the sensor 32 provided on the seat cushion pad 11.

A harness passage 58 penetrates the seat back pad 51 from the front surface to the back surface. A wire harness 59 connected to the sensor 57 extends from the front side of the seat back pad 51 to the back side of the seat cushion pad 11 through the wire harness passage 58. The wire harness passage 58 can be positioned similarly to the wire harness passage 35 of the seat cushion pad 11.

On the back surface of the seat back pad 51 is formed a recess 61 communicating with the open end on the back surface side of the wire harness passage 58. A space is defined between the recess 61 and the wall portion 6 of the vehicle body panel 4 to receive the wire harness 59 therein. The recess 61 has a groove shape and extends downward from the wire harness passage 58. More specifically, the recess 61 extends from the wire harness passage 58 toward the rotational axis X2 of the seat back pad 51. The lower end of the recess 61 may reach the lower edge of the seat back pad 51.

The effect of the seat 1 according to the foregoing embodiment is discussed in the following. Owing to the recess 45 provided on the back surface of the seat cushion pad 11, a space is created between the floor portion 5 of the vehicle body panel 4 and the back surface of the seat cushion pad 11 so that the wire harness 33 can be positioned in this space. Similarly, a space is created between the wall portion 6 of the vehicle body panel 4 and the back surface of the seat back pad 51 by the recess 61 provided on the back surface of the seat back pad 51 so that the wire harness 59 can be positioned in this space.

Since the recess 45 of the seat cushion pad 11 extends rearward from the wire harness passage 35, or in other words, toward the rotational axis X1 of the seat cushion pad 11, when the seat cushion pad 11 is rotated relative to the floor portion 5, the distance between the floor portion 5 and the wire harness 33 does not change to any significant extent so that the wire harness 33 is prevented from being pulled excessively. Similarly, the recess 61 of the seat back pad 51 extends downward from the wire harness passage 58, or in other words, toward the rotational axis X2 of the seat back pad 51 so that the wire harness 59 is prevented from being pulled excessively.

Since the wire harness passage 35 opens at a position (the rear inclined portion 28) on the front surface of the seat cushion pad 11 that avoids the pressure receiving area 30, the load of the occupant is prevented from being applied to the wire harness 33. The same is true with the seat back 3.

Second Embodiment

Figure 6:
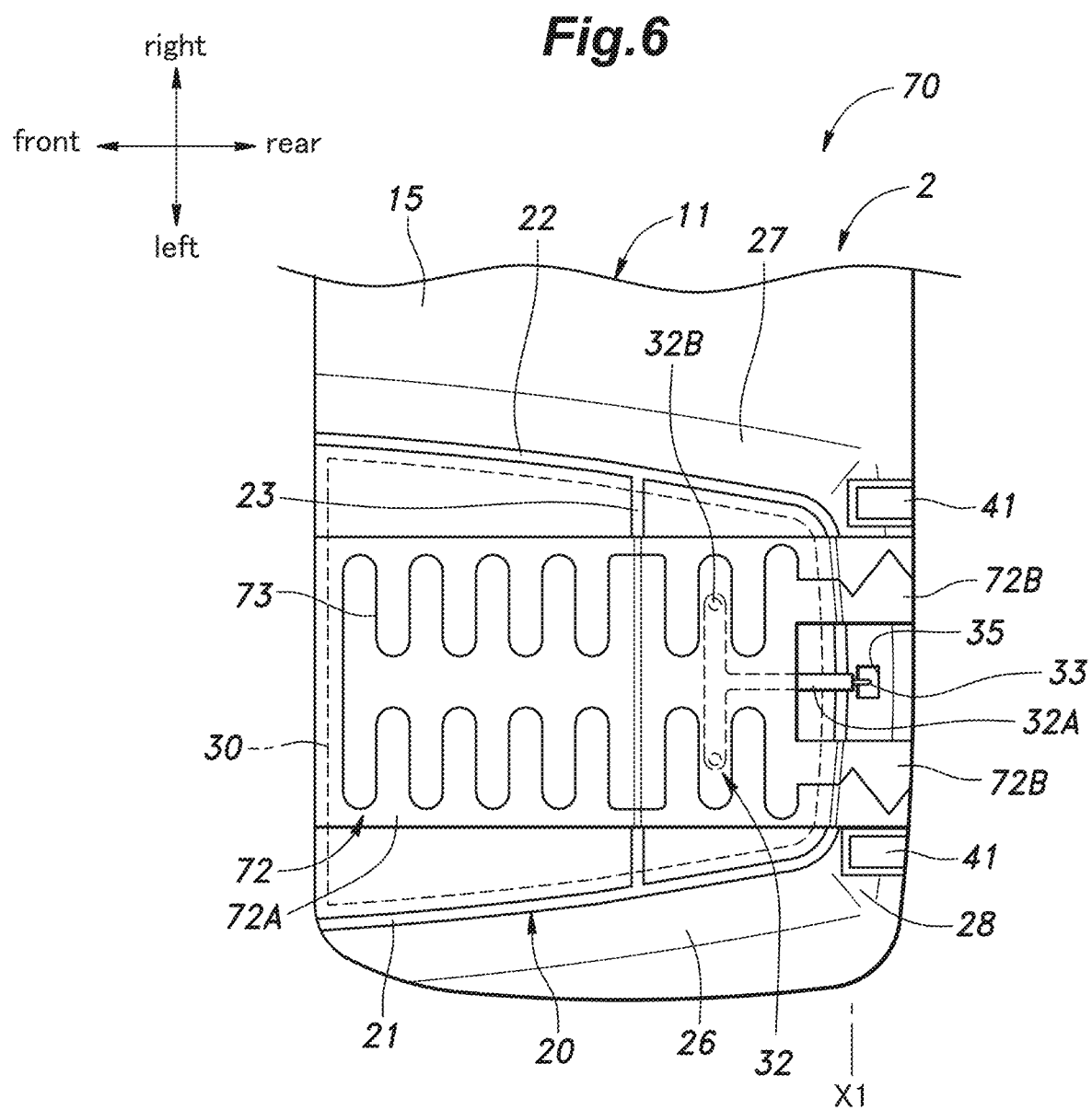
FIG. 6 is a plan view of the seat cushion pad according to a second embodiment of the present invention.

A seat 70 according to a second embodiment of the present invention is described in the following. As shown in FIG. 6, the seat 70 of the second embodiment is different from the seat 1 of the first embodiment in that the seat 70 does not have the air passage 37, and has a heater cloth 72. The seat 70 of the second embodiment is otherwise similar to the seat 1 of the first embodiment. Therefore, in the following disclosure, the parts having similar structures are denoted with like numerals without necessarily repeating the description of such parts.

The heater cloth 72 incorporated with a heater wire 73 is placed between the front surface of the seat cushion pad 11 and the skin material 12. The heater cloth 72 has a substantially rectangular main body 72A positioned in the pressure receiving area 30, and a pair of connecting portions 72B extending rearward from the rear edge of the main body 72A along either side of the main body 72A. The heater cloth 72 extends into the lateral grooves 23 and 24 and is passed under the skin material 12. The connecting portions 72B extend from the front side to the back side of the seat cushion pad 11 along the rear end of the seat cushion pad 11.

The main body 72A of the heater cloth 72 is positioned so as to overlap with the detection units 32B of the sensor 32 and a front part of the film 32A. Meanwhile, the open end of the wire harness passage 35 on the front side is positioned so as to avoid the heater cloth 72. The open end of the wire harness passage 35 on the front surface side is positioned in a region defined by the rear edge of the main body 72A and the left and right connecting portions 72B.

Third Embodiment

A seat sensor of a vehicle seat as applied to a seat sensor for a second row or third row rear seat according to a third embodiment of the present invention is described in the following.

Figure 7:
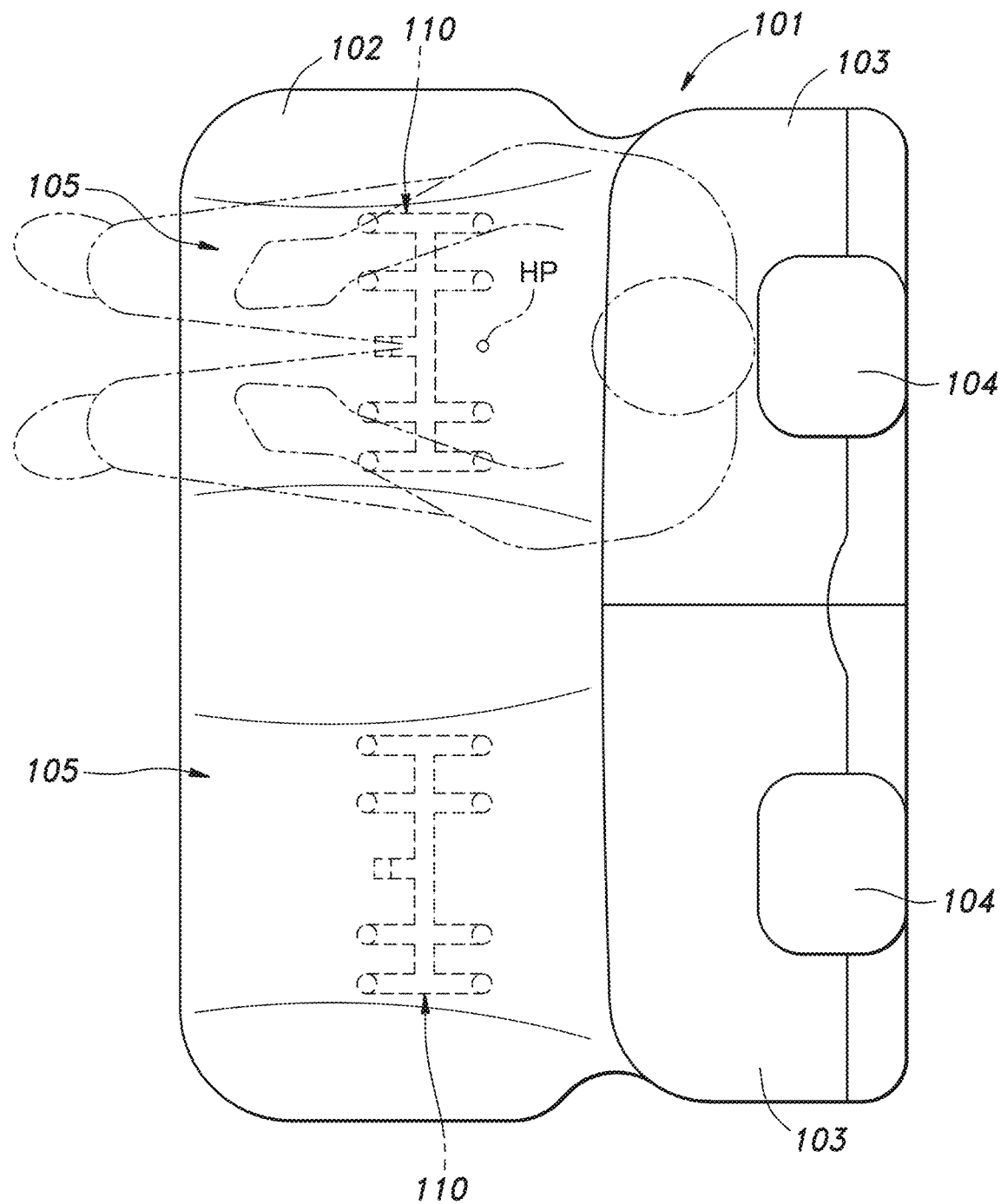
FIG. 7 is a plan view of rear seat according to a third embodiment of the present invention.
Figure 8:
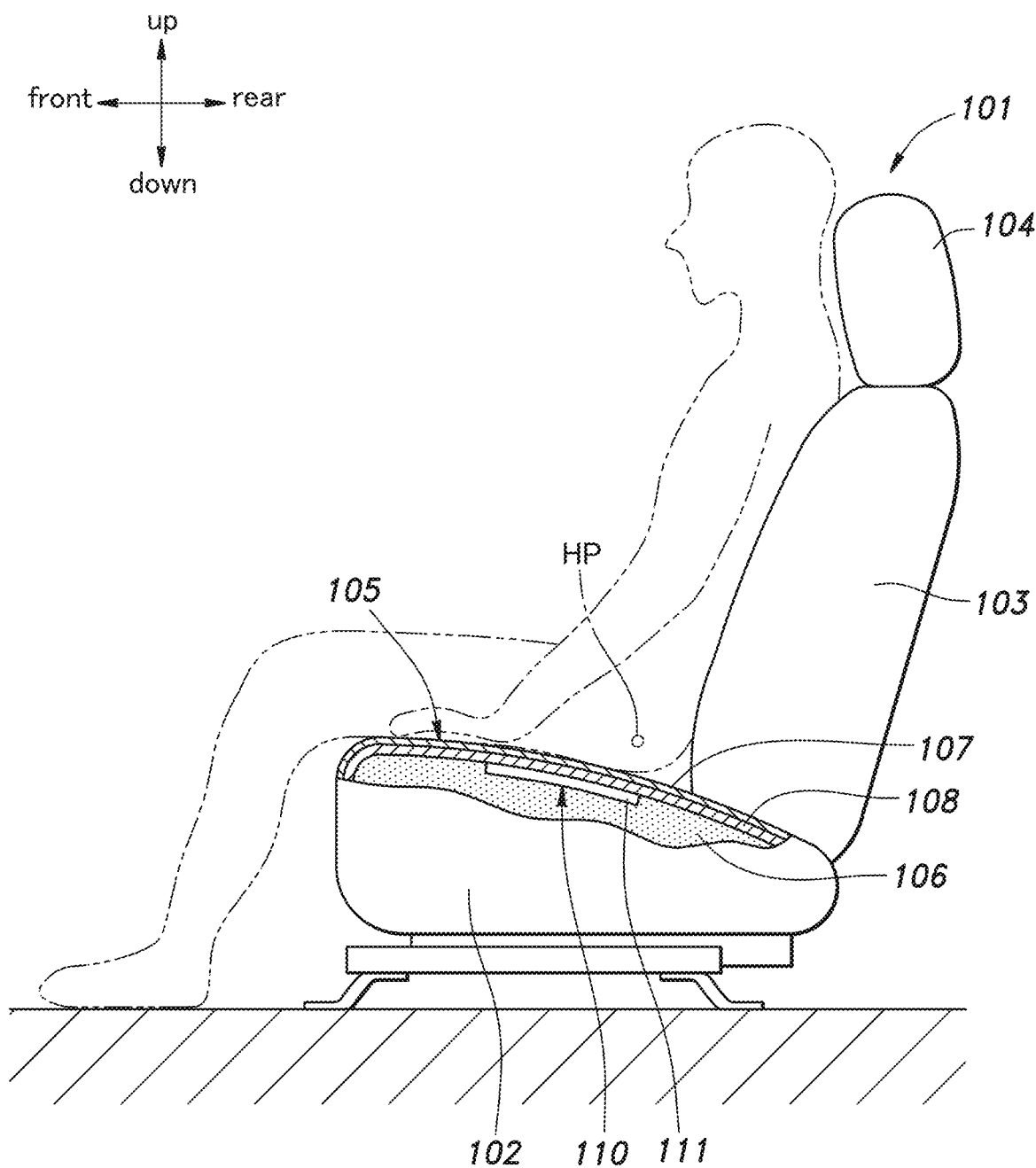
FIG. 8 is a side view of the rear seat of the third embodiment.

As shown in FIG. 7, the seat 101 includes a seat cushion 102 provided on a floor of an automobile, a pair of seat backs 103 supported on a rear portion of the seat cushion 102 laterally one next to the other, and a pair of headrests 104 provided on the upper parts of the respective seat backs 103. The seat cushion 102 extends laterally so as to form a pair of seating regions 105 for seating a pair of occupants As shown in FIG. 8, the seat cushion 102 includes a seat cushion pad 106 and a skin material 107 that covers the front surface of the seat cushion pad 106. The seat cushion pad 106 may be directly supported on a floor panel of an automobile, or may be supported on a frame structure supported on the floor panel. In the present embodiment, a sheet-like wadding material 108 is provided between the skin material 107 and the seat cushion pad 106. The wadding material 108 is optional, and may be omitted.

As shown in FIG. 8, the upper surface of each seating region 105 of the seat cushion 102 is inclined downward toward the rear end thereof. Each seating region 105 supports an occupant's buttocks and thighs.

Figure 9:
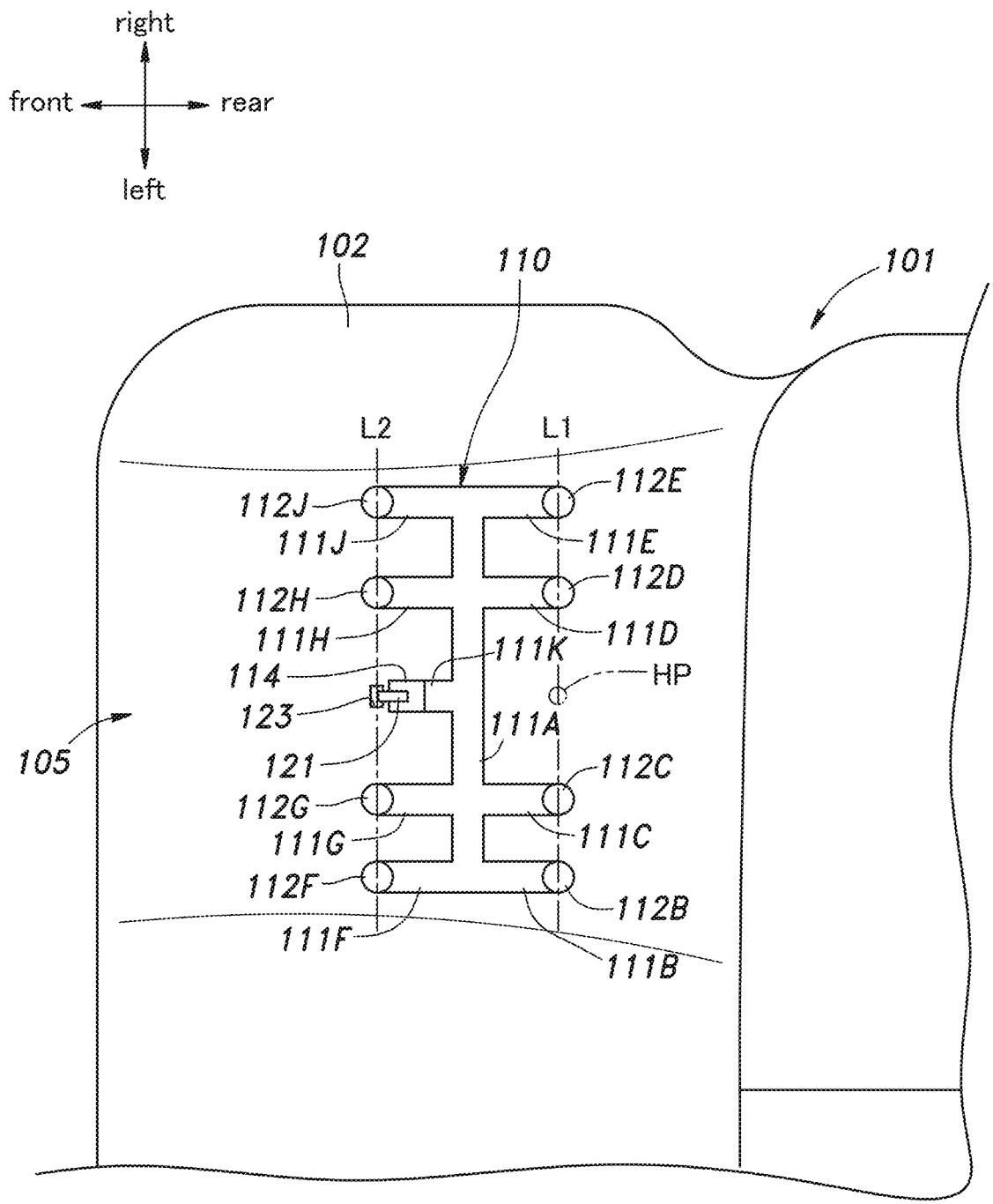
FIG. 9 is a plan view of a seat sensor provided in the rear seat of the third embodiment.

As shown in FIGS. 7 and 9, each seating region 105 is provided with a seat sensor 110 for detecting an occupant's seating. The seat sensor 110 essentially consists of a switch that is turned on when an occupant is seated and cut off when no occupant is seated. The seat sensor 110 includes a flexible sheet material 111, a plurality of pressure-sensitive switches 112 provided on the sheet material 111, and wiring 113 provided on the sheet material 111 and connected to the pressure-sensitive switches.

The sheet material 111 is placed between the wadding material 108 and the seat cushion pad 106. The sheet material 111 may be, for example, a flexible printed circuit board. The sheet material 111 includes a main part 111A extending laterally, and a plurality of branch parts 111B to 111J extending forward or rearward from the main part 111A. The main part 111A extends linearly from the left half to the right half of the occupant's seating region 105. The laterally central part of the main part 111A coincides with a line extending in the fore and aft direction in a laterally central part of the seating region 105.

In the present embodiment, the branch parts 111B to 111J include a first branch part 111B, a second branch part 111C, a third branch part 111D, and a fourth branch part 111E extending rearward from the main part 111A. The branch parts 111B to 111J further include a fifth branch part 111F, a sixth branch part 111G, a seventh branch part 111H, and an eighth branch part 111J extending forward from the main part 111A. In the present embodiment, the first to eighth branch parts 111B to 111J are orthogonal to the main part 111A.

The first branch part 111B, the second branch part 111C, the third branch part 111D, and the fourth branch part 111E are arranged laterally from left to right in that order in a mutually spaced apart relationship. The first branch part 111B and the second branch part 111C are positioned in the left half of the seating region 105, and the third branch part 111D and the fourth branch part 111E are positioned in the right half of the seating region. The lateral distance between the first branch part 111B and the second branch part 111C is equal to the lateral distance between the third branch part 111D and the fourth branch part 111E. The lateral distance between the second branch part 111C and the third branch part 111D is larger than the distance between the lateral distance between the first branch part 111B and the second branch part 111C. The lateral distance between the second branch part 111C and the third branch part 111D is preferably larger than the distance between the first and second branch parts 111B and 111C by the factor of two to three.

The fifth branch part 111F, the sixth branch part 111G, the seventh branch part 111H, and the eighth branch part 111J are arranged laterally from left to right in that order in a mutually spaced apart relationship. The fifth branch part 111F and the sixth branch part 111G are arranged on the left half of the seating region 105, and the seventh branch part 111H and the eighth branch part 111J are arranged on the right half of the seating region. The fifth branch part 111F is linearly arranged in front of the first branch part 111B, the sixth branch part 111G is linearly arranged in front of the second branch part 111C, the seventh branch part 111H is linearly arranged in front of the third branch part 111D, and the eighth branch part 111J is linearly arranged in front of the fourth branch part 111E. The lateral distance between the fifth branch part 111F and the sixth branch part 111G and the lateral distance between the seventh branch part 111H and the eighth branch part 111J are each equal to the lateral distance between the first branch part 111B and the second branch part 111C. The lateral distance between the sixth branch part 111G and the seventh branch part 111H is equal to the distance between the second branch part 111C and the third branch part 111D.

The first to fourth branch parts 111B to 111E have the same length. The fifth to eighth branch parts 111F to 111J have the same length. The first to eighth branch parts 111B to 111J may all have an equal length.

A ninth branch part 111K extends forward from a laterally central part of the main part 111A. The front end of the ninth branch part 111K is provided with a connecting portion 114 for connection to a wire harness 121 to provide as an external wiring. The ninth branch part 111K is preferably shorter than the fifth to eighth branch parts 111F to 111J.

In the present embodiment, the pressure-sensitive switches 112 include first to eighth pressure-sensitive switches 112B to 112J. Each pressure-sensitive switch 112 is a membrane switch, and is provided on a frame-like spacer sheet, a pair of contact sheets stacked one over the other via the frame-like spacer sheet, and a pair of electric contacts provided on opposing surfaces of the contact sheets, respectively. When the pressure-sensitive switch 112 receives an external load, the contact sheets bend with the result that the two contacts come into contact with each other to be in a conductive state or the pressure-sensitive switch 112 is turned on. The pressure at which the contacts come into contact with each other can be changed by adjusting the size and thickness of the contacts, the thickness and shape of the spacer, the stiffness of the contact sheets, and the like. The pressure-sensitive switches 112 may also be of any other configuration as long as it is a switch that conducts electricity upon detecting pressure.

As shown in FIG. 9, the first pressure-sensitive switch 112B is provided at the tip end (rear end) of the first branch part 111B, the second pressure-sensitive switch 112C is provided at the tip end (rear end) of the second branch part 111C, the third pressure-sensitive switch 112D is provided at the tip end (rear end) of the third branch part 111D, the fourth pressure-sensitive switch 112E is provided at the tip end (rear end) of the fourth branch part 111E, the fifth pressure-sensitive switch 112F is provided at the tip (tip end) of the fifth branch part 111F, the sixth pressure-sensitive switch 112G is provided at the tip (tip end) of the sixth branch part 111G, the seventh pressure-sensitive switch 112H is provided at the tip (tip end) of the seventh branch part 111H, and the eighth pressure-sensitive switch 112J is provided at the tip (tip end) of the eighth branch part 111J.

The first to fourth pressure-sensitive switches 112B to 112E are arranged on a first imaginary straight line L1 extending laterally. The fifth to eighth pressure-sensitive switches 112F to 112J are arranged on a second imaginary straight line L2 extending also extending laterally. The first imaginary straight line L1, the second imaginary straight line L2, and the main part 111A are arranged in parallel with each other. The first imaginary straight line L1 is positioned behind the main part 111A, and the second imaginary straight line L2 is positioned ahead of the main part 111A.

The occupant's hip point HP is positioned on the first imaginary straight line L1. The hip point HP is defined by the American SAE standard J-826, and is given by the rotational center points (the position of the hip joints) between the torso and the thighs of a three-dimensional mannequin. In plan view, the hip point is a central point of a line segment connecting the two rotational center points.

Preferably, the front edge of the connecting portion 114 provided at the tip end of the ninth branch part 111K is positioned behind the second imaginary straight line L2 and forward of the first imaginary straight line L1. Thereby, the overall fore and aft width of the seat sensor 110 can be reduced.

Figure 10:
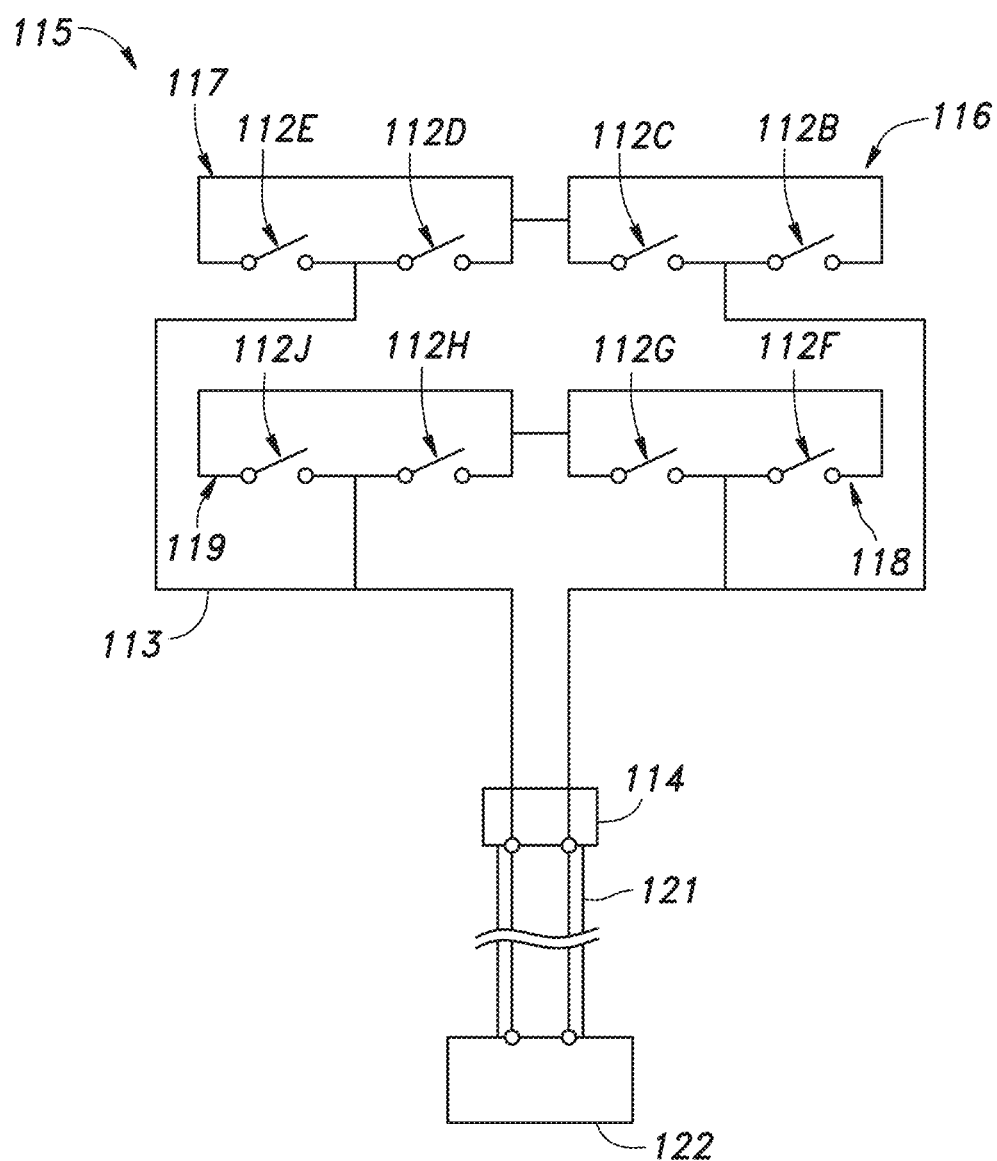
FIG. 10 is a circuit diagram of the seat sensor of the third embodiment

As shown in FIG. 10, the wiring 113 provided on the sheet material 111 connects the first to eighth pressure-sensitive switches 112B to 112J so as to form a detection circuit 115. The wiring 113 connects the first pressure-sensitive switch 112B and the second pressure-sensitive switch 112C in parallel to each other to form a first circuit 116, connects the third pressure-sensitive switch 112D and the fourth pressure-sensitive switch 112E in parallel to each other so as to form a second circuit 117, and connects the first circuit 116 and the second circuit 117 in series to each other. Further, the wiring 113 connects the fifth pressure-sensitive switch 112F and the sixth pressure-sensitive switch 112G in parallel to each other to form a third circuit 118, connects the seventh pressure-sensitive switch 112H and the eighth pressure-sensitive switch 112J in parallel to each other to form a fourth circuit 119, and connects the third circuit 118 and the fourth circuit 119 in series to each other. The detection circuit 115 is formed by connecting the first circuit 116 and the second circuit 117 and the third circuit 118 and the fourth circuit 119 in parallel to one another via the wiring 113. The two ends of the wiring 113 are provided at the connecting portion 114, and are connected to a control unit 122 via a wire harness 121. The wire harness 121 is passed through a passage 123 vertically penetrating the seat cushion pad 106, and extend under the seat cushion pad 106. The upper end of the passage 123 may be positioned on the second imaginary straight line L2 or behind the second imaginary straight line L2. Thereby, the passage 123 can be formed close to the seat sensor 110 so that the area on the upper surface of the seat cushion pad 106 occupied by the wire harness 121 can be minimized. Further, the seat sensor 110 and the passage 123 can be arranged compactly.

The first pressure-sensitive switch 112B is configured to be turned on under a larger load than the second pressure-sensitive switch 112C, and the fourth pressure-sensitive switch 112E is configured to be turned on under a larger load than the third pressure-sensitive switch 112D. Preferably, the first pressure-sensitive switch 112B and the fourth pressure-sensitive switch 112E have a same ON load, and the second pressure-sensitive switch 112C and the third pressure-sensitive switch 112D have a same ON load. The fifth pressure-sensitive switch 112F is configured to be turned on at a larger load than the sixth pressure-sensitive switch 112G, and the eighth pressure-sensitive switch 112J is configured to be turned on under a larger load than the seventh pressure-sensitive switch 112H. The fifth pressure-sensitive switch 112F and the eighth pressure-sensitive switch 112J may have a same ON load, and the sixth pressure-sensitive switch 112G and the seventh pressure-sensitive switch 112H may have a same ON load. Preferably, the first pressure-sensitive switch 112B and the fifth pressure-sensitive switch 112F have a same ON load, and the second pressure-sensitive switch 112C and the sixth pressure-sensitive switch 112G have a same ON load.

An example of positioning of the pressure-sensitive switches 112 is given in the following. The lateral distance between the second pressure-sensitive switch 112C and the third pressure-sensitive switch 112D is preferably between 60 mm and 100 mm. The distance between the first pressure-sensitive switch 112B and the second pressure-sensitive switch 112C and the distance between the third pressure-sensitive switch 112D and the fourth pressure-sensitive switch 112E are preferably between 30 and 50 mm. The distance between the first pressure-sensitive switch 112B and the fifth pressure-sensitive switch 112F in the fore and aft direction is preferably between 60 mm and 80 mm. These numerical ranges include the boundary values.

The control unit 122 determines if the occupant is seated according to the conductive state (ON, OFF) of the seat sensor 110. Further, the control unit 122 determines if a seat belt is worn in each seating region 105. When the control unit 122 has determined that the occupant is seated in the seating region 105, and the seat belt is not worn, the occupant is warned by sound or by turning on an alarm lamp.

The effect of the seat sensor 110 of the present embodiment is discussed in the following. The sheet material 111 includes the main part 111A extending laterally, and the first to eighth branch part 111B to 111J extending forward or rearward from the main part 111A. The first to eighth pressure-sensitive switch 112B to 112J are provided at the tips of the first to eighth branch parts 111B to 111J, respectively. Therefore, each adjacent pair of pressure-sensitive switches 112B to 112J are connected to each other via the two corresponding branch parts 111B to 111J and the main part 111A. Therefore, when a load is applied to a certain pressure-sensitive switch 112B-112J, the deformation of the branch part 111B-111J on which the pressure-sensitive switch 112B-112J is located is not likely to be transmitted to the branch part 111B to 111J on which the adjacent pressure-sensitive switch 112B-112J is located. In particular, when the pressure-sensitive switches 112 are linearly arranged laterally as is the case with the first to fourth pressure-sensitive switches 112B to 112E or the fifth to eighth pressure-sensitive switches 112F to 112J, erroneous detection of the pressure-sensitive switches 112B to 112J due to the deformation of the sheet material 111 can be minimized.

Since the occupant's hip point HP is located on the first imaginary straight line L1, the first to fourth pressure-sensitive switches 112B to 112E are thus positioned at parts where the occupant's load is most likely to be applied.

When at least one of the first pressure-sensitive switch 112B and the second pressure-sensitive switch 112C is turned on and at least one of the third pressure-sensitive switch 112D and the fourth pressure-sensitive switch 112E is turned on, the detection circuit 115 is turned on so that the seating sensor 110 detects the seating of a seat occupant. Therefore, even when the occupant's stature/build varies or the occupant's seating position is shifted to the left or to the right, the seat sensor 110 can reliably detect the occupant. For example, when the occupant is person of a large stature/build, all of the first to fourth pressure-sensitive switches 112B to 112E are turned on so that the detection circuit 115 is turned on. When the occupant is small like a child, the second and third pressure-sensitive switches 112C and 112D are turned on so that the detection circuit 115 is turned on. When the occupant is seated with a shift to the left, at least one of the first and second pressure-sensitive switches 112B and 112C, and the third pressure-sensitive switch 112D are turned on so that the detection circuit 115 is turned on. When the occupant is seated with a shift to the right, at least one of the third and fourth pressure-sensitive switches 112D and 112E and the second pressure-sensitive switch 112C are turned on so that the detection circuit 115 is turned on.

Further, since the front switch row including the fifth to eighth pressure-sensitive switches 112F to 112J are provided in front of the rear switch row including the first to fourth pressure-sensitive switches 112B to 112E, even when the occupant is seated with a forward shift, the seat sensor 110 can reliably detect the occupant by the front switch row.

Since the first pressure-sensitive switch 112B is configured to be turned on under a load greater than the second pressure-sensitive switch 112C, and the fourth pressure-sensitive switch 112E is configured to be turned on under a load greater than the third pressure-sensitive switch 112D, the sensor 110 is prevented from erroneously detecting an object other than a person as an occupant. When the occupant is seated with a lateral shift, the load applied to the pressure-sensitive switch 112 located on the side of the shifted direction (the first pressure-sensitive switch 112B when the occupant is seated with a leftward shift) becomes larger than the load applied to the pressure-sensitive switch 112C, 112D located on the side away from the shifted direction. When the occupant has a large stature/build, the load applied to the laterally outer pressure-sensitive switches 112B and 112E increases. When the stature/build of the occupant is small, the load applied to the laterally inner pressure-sensitive switches 112C and 112D increases. Therefore, a seat occupant can be detected in an appropriate manner if the load under which the first and fourth pressure-sensitive switches 112B and 112E that are located on the laterally outer sides are turned on is greater than the load under which the second and third pressure-sensitive switches 112C and 112D that are located on the laterally inner sides are turned on. By making the load under which the first and fourth pressure-sensitive switches 112B and 112E that located on the laterally outer sides are turned on to be greater than the load under which the second and third pressure-sensitive switches 112C and 112D located on the laterally inner sides are turned on, the first and fourth pressure-sensitive switches 112B and 112E are prevented from erroneously turning on under a load of an object lighter than a person. The same applies to the fifth to eighth pressure-sensitive switches 112F to 112J located on the front side.

Fourth Embodiment

Figure 11:
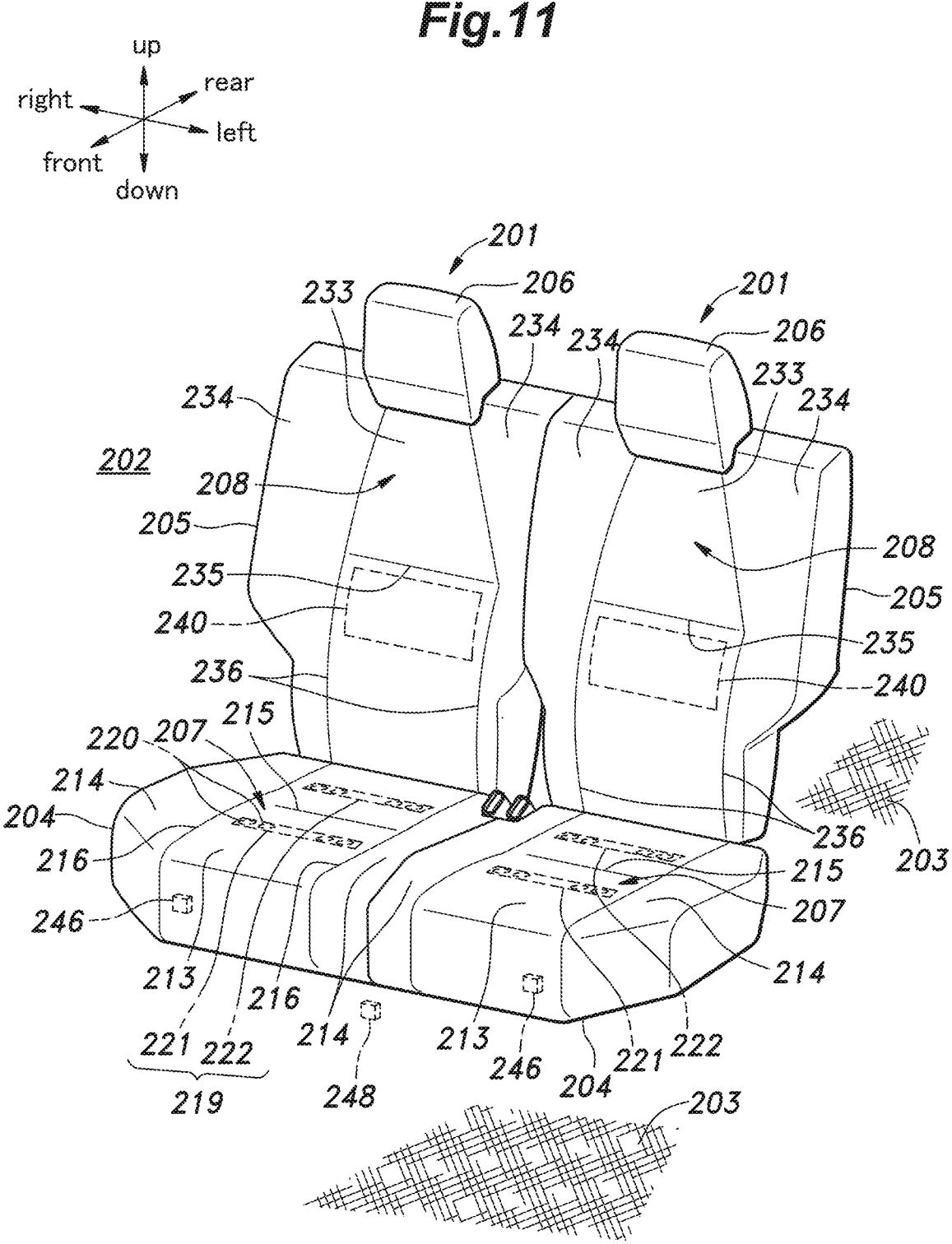
FIG. 11 is a perspective view of a vehicle seat according to a fourth embodiment of the present invention.

As shown in FIG. 11, a pair of vehicle seats 201 according to a fourth embodiment of the present invention are arranged in the vehicle width direction or laterally one next to the other on a floor 203 that defines a bottom portion of a cabin 202 of an automobile. The two vehicle seats 201 are generally symmetrical to each other. The vehicle seats 201 form the rear seats of the second or any subsequent row in the vehicle. Each vehicle seat 201 includes a seat cushion 204 that supports the buttocks of a seated person, a seat back 205 provided at the rear end of the seat cushion 204 to function as a backrest, and a headrest 206 provided in an upper part of the seat back 205.

The seat cushions 204 has a substantially rectangular parallelepiped shape having a surface that faces substantially vertically. The upper surface of the seat cushion 204 forms a seating surface 207 for a single occupant. The seating surface 207 is recessed downward in a laterally central part thereof, and is slightly inclined downward in the fore and aft direction toward the rear end thereof. Thus, the seating surface 207 has a shape corresponding to the buttocks and thighs of a seat occupant. When a occupant is seated, the buttocks and thighs of the occupant are positioned on the seating surface 207.

The seat back 205 extends vertically and has a substantially rectangular parallelepiped shape having a surface that faces substantially in the fore and aft direction. The front surface of the seat back 205 forms a support surface 208 for supporting the occupant's back. The support surface 208 is recessed rearward substantially at a laterally central part thereof, and is inclined slightly rearward toward the upper end thereof. Thus, the support surface 208 has a shape corresponding to the back of the occupant, and the back of the occupant is supported by the support surface 208.

The lower end of the seat back 205 is pivotally supported by the rear end of the seat cushion 204 via a per se known reclining mechanism. In other words, the seat back 205 is connected to the rear end of the seat cushion 204 at the lower end so as to be pivotable forward and backward.

Figure 12:
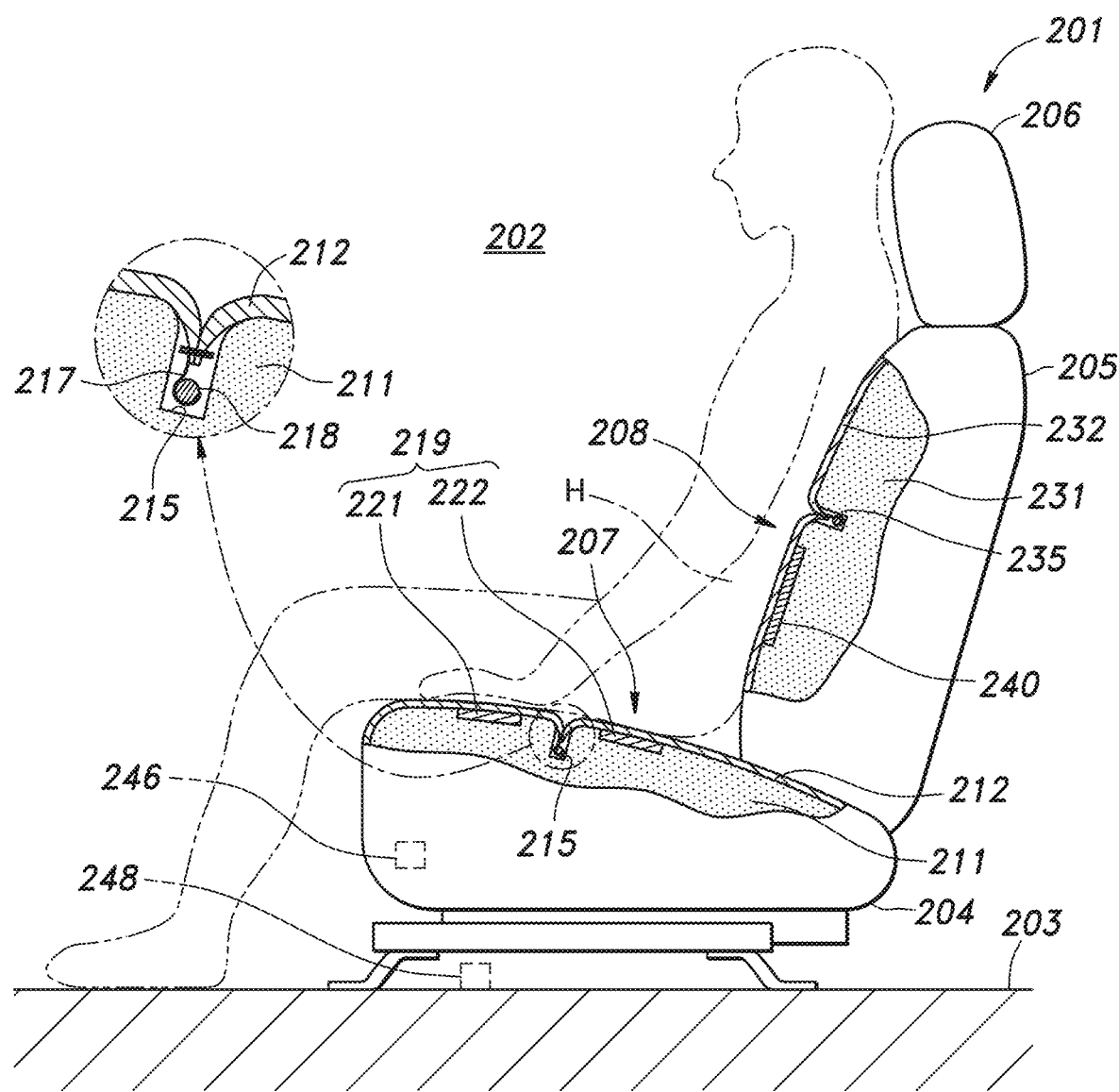
FIG. 12 is a side view of the vehicle seat of the fourth embodiment and an enlarged sectional view of a part thereof adjacent to a first lateral listing groove.

As shown in FIG. 12, the seat cushion 204 includes a seat cushion frame (not shown) serving as a structural framework, a pad member 211 supported by the seat cushion frame, and a skin material 212 placed on the front surface of the pad member 211 to define the outer profile of the seat cushion 204.

Figure 13:
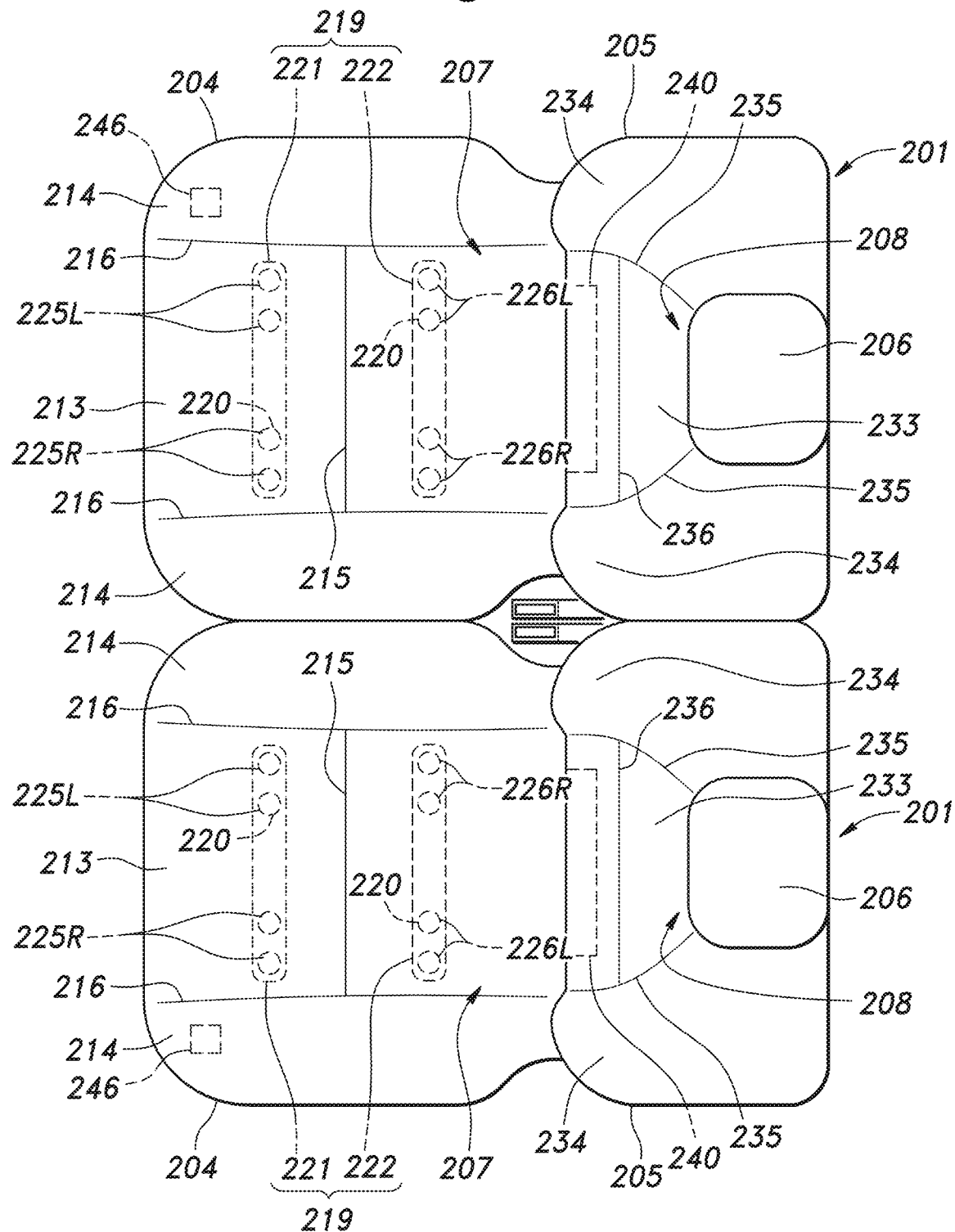
FIG. 13 is a top view of the vehicle seat of the fourth embodiment.

As shown in FIG. 11, the upper surface of the pad member 211 of the seat cushion 204 includes an intermediate portion 213 which is inclined downward toward the rear end thereof in a laterally middle part thereof, and a pair of bulging portions 214 bulging upward on either lateral side of the intermediate portion 213. As shown in FIG. 13, the upper surface of the pad member 211 of the seat cushion 204 is further provided with a first lateral listing groove 215 extending laterally at a substantially middle part with respect to the fore and aft direction, and a pair of first longitudinal listing grooves 216 extending from the front edge and the rear edge of the seat cushion 204. Each first longitudinal listing groove 216 is formed substantially along the boundary between the intermediate portion 213 and the corresponding bulging portion 214. The first lateral listing groove 215 is connected to the first longitudinal listing grooves 216 at the respective ends thereof.

The first lateral listing groove 215 and the first longitudinal listing grooves 216 each consist of a downwardly recessed groove formed on the upper surface of the pad member 211 (refer to FIG. 12 for the first lateral listing groove 215). The skin material 212 covering the pad member 211 is provided with a plurality of hook members 217 at positions corresponding to the first lateral listing groove 215 and the first longitudinal listing grooves 216. Each hook member 217 is inserted into the first lateral listing groove 215 or the first longitudinal listing groove 216. A fixing member 218 is provided inside each of the first lateral listing groove 215 and the first longitudinal listing grooves 216. The hook members 217 are hooked onto the corresponding fixing members 218 so that the skin material 212 is pulled into in the first lateral listing groove 215 and the first longitudinal listing grooves 216 via corresponding listing strips. Therefore, the first lateral listing groove 215 and the first longitudinal listing grooves 216 can be considered as grooves provided in the seat cushion 204 for pulling the skin material 212 into the seat cushion 204.

As shown in FIG. 12, a pressure-sensitive sensor unit 219 for detecting a load applied to the seating surface 207 is provided between the front surface of the pad member 211 of the seat cushion 204 and the back surface of the skin material 212 of the seat cushion 204. The pressure-sensitive sensor unit 219 consists of a flexible sheet-like member incorporated with a plurality of pressure-sensitive switches 220 (see FIG. 11), and thus forms a so-called membrane switch. Each pressure-sensitive switch 220 is provided with an electrode placed along the surface of the pressure-sensitive sensor unit 219. Each pressure-sensitive switch is turned on (or conducts) when a load equal to or greater than a predetermined value is applied to the electrode by pressing the surface of the pressure-sensitive sensor unit 219. Therefore, the pressure-sensitive switches 220 function as pressure sensors that detect the pressure applied to the electrodes. The pressure sensor unit 219 includes a first subunit 221 and a second subunit 222. Each of the first subunit 221 and the second subunit 222 consists of a sheet-like member, and is incorporated with a plurality of pressure-sensitive switches 220. As shown in FIG. 12, the first subunit 221 and the second subunit 222 are arranged so as to extend in the lateral direction along the surface of the pad member 211. The back side of the first subunit 221 and the back side of the second subunit 222 are in contact with the front surface of the pad member 211 of the seat cushion 204. The first subunit 221 and the second subunit 222 are connected to each other by wiring 223.

As shown in FIG. 13, the first subunit 221 is positioned in front of the first lateral listing groove 215 and between the left and right first longitudinal listing grooves 216. The second subunit 222 is located behind the first lateral listing groove 215 and between the left and right first longitudinal listing grooves 216. Thus, the pressure-sensitive switches 220 are provided both ahead of and behind the first lateral listing groove 215.

In the present embodiment, the first subunit 221 and the second subunit 222 are each provided with two pairs of pressure-sensitive switches 220, each pair consisting of two pressure-sensitive switches 220 positioned laterally next to each other. The pressure-sensitive switch pairs are positioned at the left and right ends of the first subunit 221, respectively, and the pressure-sensitive switch pairs are positioned at the left and right ends of the second subunit 222, respectively. More specifically, one of the pressure-sensitive switch pairs (the first left pressure-sensitive switch pair 225L) are provided at the left end of the first subunit 221, and the other pressure-sensitive switch pair (the first right pressure-sensitive switch pair 225R) are provided at the right end of the first subunit 221. Similarly, one of the pressure-sensitive switch pairs (the second left pressure-sensitive switch pair 226L) are provided at the left end of the second subunit 222, and the other pressure-sensitive switch pair (the second right pressure-sensitive switch pair 226R) are provided at the right end of the second subunit 222. Further, the first left pressure-sensitive switch pair 225L and the first right pressure-sensitive switch pair 225R laterally align with each other (coincide with each other with respect to the fore and aft positioning), and the second left pressure-sensitive switch pair 226L the second right pressure-sensitive switch pair 226R laterally align with each other (coincide with each other with respect to the fore and aft positioning).

Figure 14:
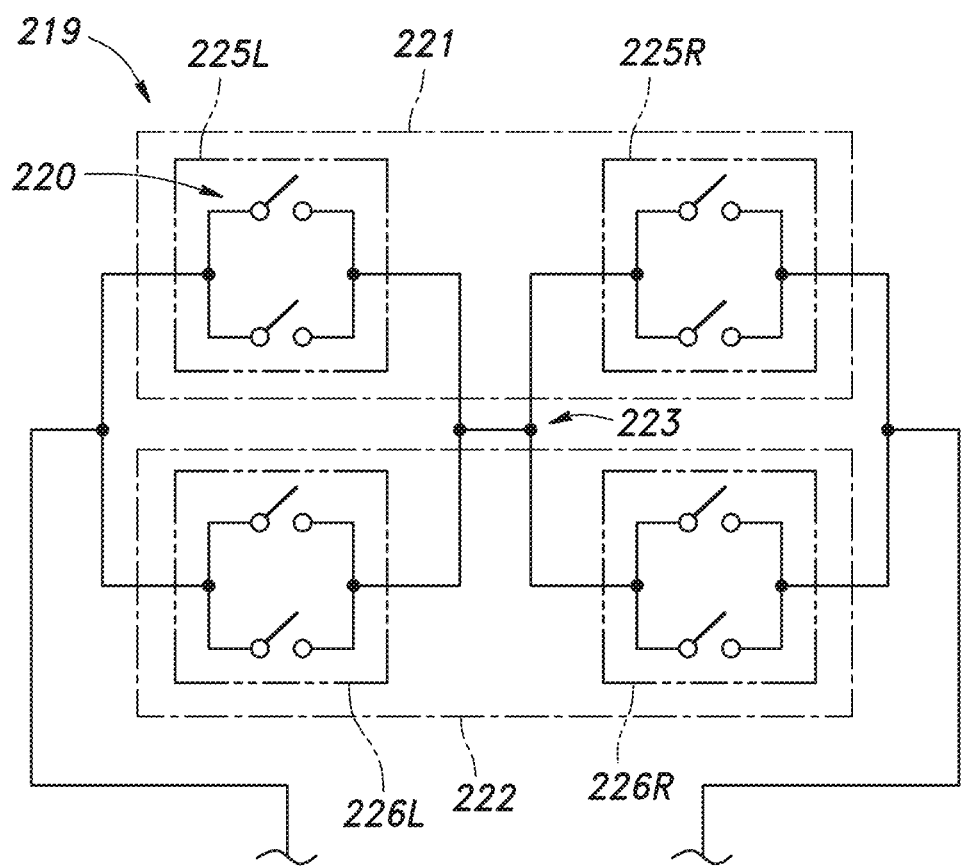
FIG. 14 is a circuit diagram of a pressure-sensitive sensor sheet of the fourth embodiment.

FIG. 14 shows a circuit diagram of the pressure-sensitive sensor unit 219. As shown in FIG. 14, the pressure-sensitive switches 220 included in each pressure-sensitive switch pair 225L, 225R, 226L and 226R are connected in parallel to each other (two-dot chain lines in FIG. 14). In other words, each pressure-sensitive switch pair 225L, 225R, 226L and 226R is turned on when either one of the corresponding pressure-sensitive switches 220 is turned on. Further, when the first left pressure-sensitive switch pair 225L or the second left pressure-sensitive switch pair 226L is ON and the first right pressure-sensitive switch pair 225R or the second right pressure-sensitive switch pair 226R is turned ON, the sensor unit 219 turns ON and becomes conductive.

As shown in FIG. 12, the seat back 205 is provided with a seat back frame (not shown) serving as a structural framework, a pad member 231 supported by the seat back frame, and a skin material 232 placed on the surface of the pad member 231 to define the outer profile of the seat back 205.

As shown in FIG. 11, the front surface of the pad member 231 of the seat back 205 includes an intermediate portion 233 that is located substantially laterally central part thereof and inclined upward toward the rear end thereof, and a pair of bulging portions 234 bulging forward along either side of the intermediate portion 233. Further, the front surface of the pad member 231 is provided with a second lateral listing groove 235 extending laterally at a substantially central portion in the vertical direction, and a pair of second longitudinal listing grooves 236 extending from the upper edge to the lower edge of the pad member 231. The second lateral listing groove 235 extends substantially between the boundaries between the intermediate portion 233 and the bulging portions 234, and the second lateral listing groove 235 is connected to the second longitudinal listing grooves 236 at the two ends thereof, respectively.

The second lateral listing groove 235 and the second longitudinal listing grooves 236 each consist of a rearwardly recessed groove formed on the front surface of the pad member 231 of the seatback 205. The second lateral listing groove 235 and the second longitudinal listing grooves 236 are provided for pulling the skin material 232 of the seat back 205 into the cushion member, similarly to the first lateral listing groove 215 and the first longitudinal listing grooves 216 mentioned earlier.

Figure 19:
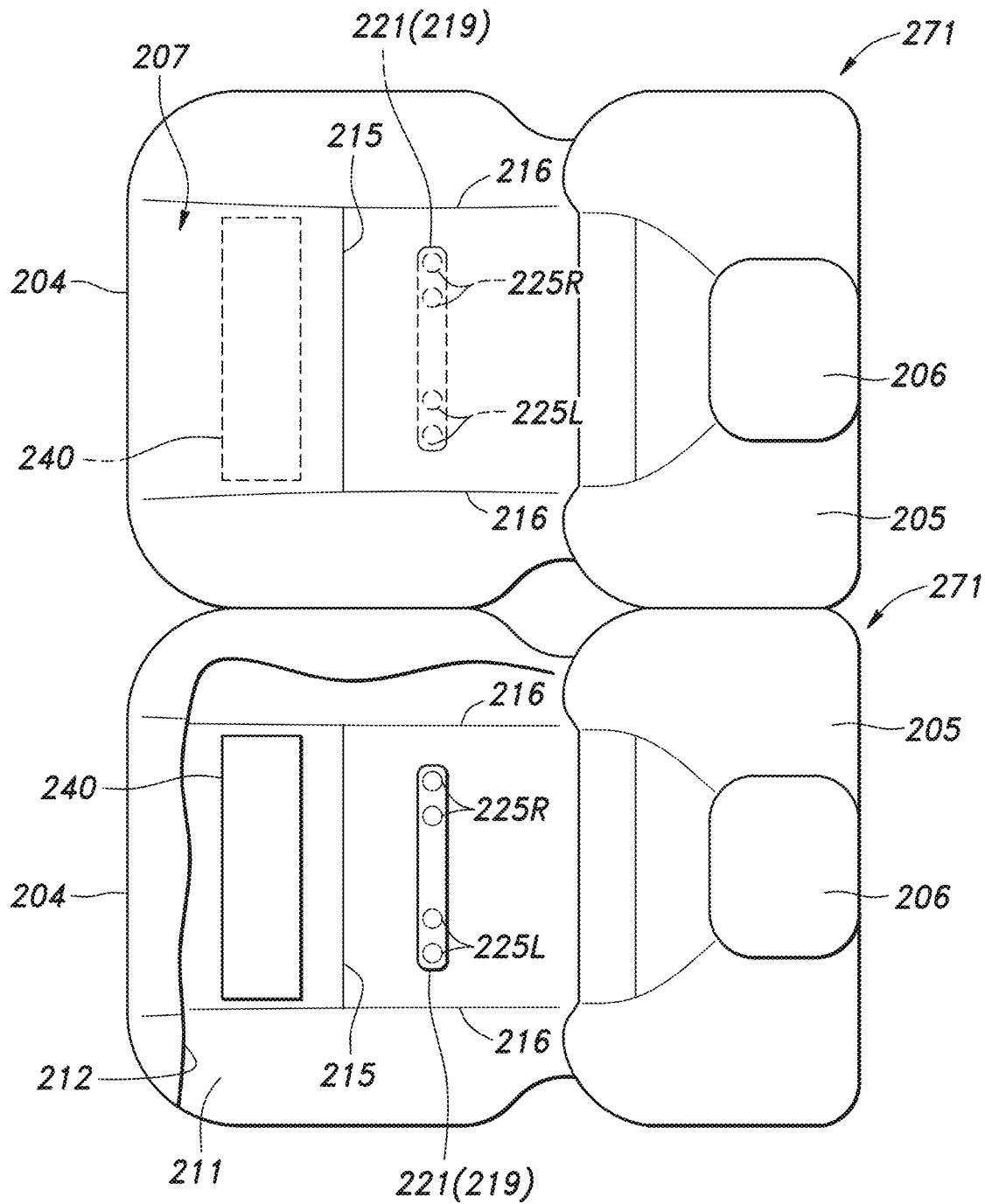
FIG. 19 is a top view of a vehicle seat according to a seventh embodiment of the present invention.

As shown in FIG. 19, a capacitance sensor 240 is positioned between the front surface of the pad member 231 of the seat back 205 and the back surface of the skin material 232. The capacitance sensor 240 is in the form of a flexible film. The capacitance sensor 240 is a non-contact type proximity sensor that is turned on by an approaching object. More specifically, the capacitance sensor 240 is turned ON when an object having a large relative dielectric constant is located within a predetermined distance (detection distance) from the surface thereof. The object having a large relative permittivity as discussed here is an object having a relative permittivity of 10 or more, more preferably 30 or more, and includes water, a human body and the like. The detection distance is 10 cm or less, and more preferably 30 cm or less.

As shown in FIG. 12, the capacitance sensor 240 is provided along the front surface of the pad member 231 of the seat back 205. As shown in FIG. 11, the capacitance sensor 240 is positioned between the left and right second longitudinal listing grooves 236. The capacitance sensor 240 is positioned below the second lateral listing groove 235 and at a location corresponding to the occupant's hip region H (lumbar region), or in other words, behind the occupant's hip region H (see FIG. 12). More precisely, the hip region H means the back part of the occupant located behind the lumbar vertebra of the occupant, and the location of the hip region is preferably determined by using a three-dimensional sitting human model for measuring the size of the vehicle interior dimensions as specified in JIS D4607.

As shown in FIGS. 11 and 12, the vehicle seat 201 is provided with a determination unit 246 for determining the seating of an occupant. The determination unit 246 consists of a computer including a central processing unit (CPU) and a storage device such as memory, and includes an input unit to receive an external signal and an output unit to forward a signal to the outside. The determination unit 246 is connected to the pressure-sensitive sensor unit 219 and the capacitance sensor 240 at the input unit thereof. In the present embodiment, the determination unit 246 is attached to the lower surface of the seat cushion 204 of the vehicle seat 201. The determination unit 246 executes a determination process to determine if the occupant is seated according to the signal from the pressure-sensitive sensor unit 219 received at the input unit (ON/OFF of the pressure-sensitive sensor unit 219), and the signal from the capacitance sensor 240 received at the input unit (ON/OFF of the capacitance sensor 240). The details of the determination process are described in the following with reference to the flowchart shown in FIG. 15.

Figure 15:
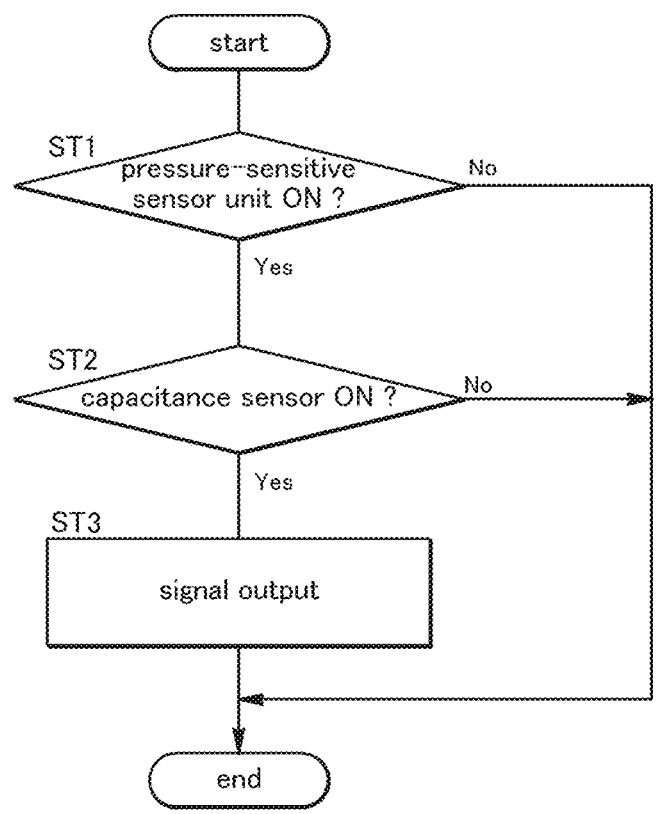
FIG. 15 is a flowchart of a determination process.

As shown in FIG. 15, in the first step ST1, the determination unit 246 determines if the pressure-sensitive sensor unit 219 is ON or OFF. When the pressure-sensitive sensor unit 219 is ON, step ST2 is executed, and when the pressure-sensitive sensor unit 219 is OFF, the determination process ends.

The determination unit 246 determines if the capacitance sensor 240 is ON or OFF in step ST2. The determination unit 246 executes step ST3 when the capacitance sensor 240 is ON, and ends the determination process when the capacitance sensor 240 is OFF.

In step ST3, the determination unit 246 outputs a signal indicating that an occupant is seated from the output unit, and ends the determination process.

The output unit of the determination unit 246 may be connected to a control unit 248 (ECU) mounted on the vehicle body. The control unit 248 (ECU) may be, for example, a computer that controls the motion of the vehicle body. When the vehicle is driven, the control unit 248 instructs the determination unit 246 to execute the determination process, receives the signal output from the determination unit 246, and determines if a seat belt is worn by the seated occupant as required. When the control unit 248 determines that the seat belt is not worn by the seated occupant as required, the control unit 248 may issue a warning to the occupant.

The effect of the vehicle seat 201 is discussed in the following. The determination unit 246 outputs a signal corresponding to the fact that the occupant is seated when the pressure-sensitive sensor unit 219 is ON and the capacitance sensor 240 is ON. In other words, the determination unit 246 determines the seating of the occupant based on the signal (ON, OFF) from the pressure-sensitive switch 220 included in the pressure-sensitive sensor unit 219 and the signal (ON, OFF) from the capacitance sensor 240.

Figure 16A:
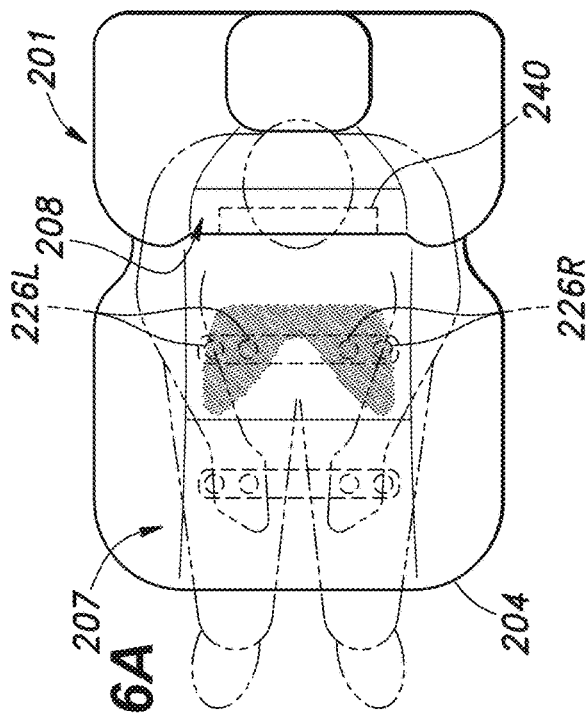
FIG. 16 shows top views of a vehicle sheet when an occupant is seated in (A) a rear part, (B) a front part, and (C) a right part of a seating surface, and (D) when a sack of rice is placed on the seating surface.
Figure 16C:
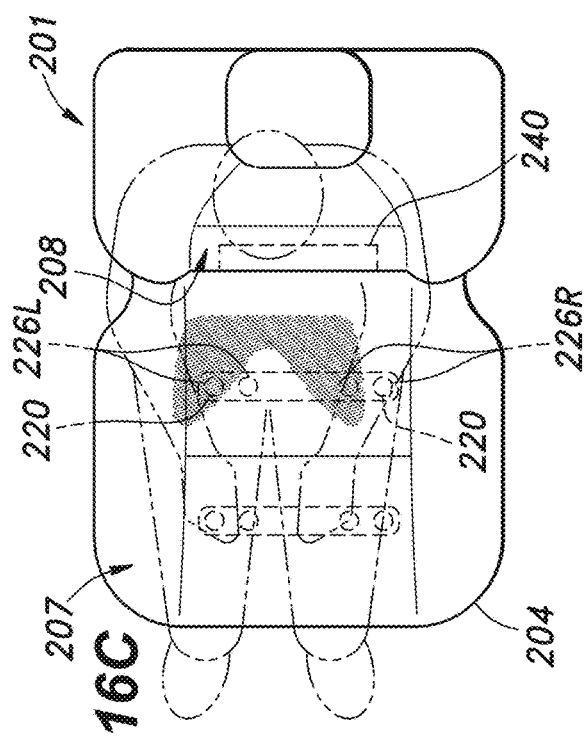
Figure 16B:
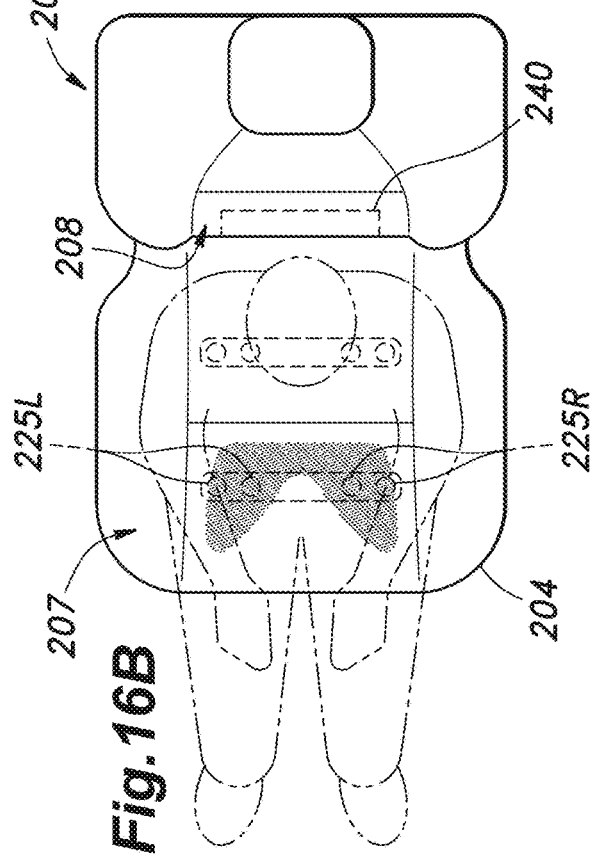

Suppose that the occupant is seated on the vehicle seat 201, and a load is applied to the part of the seating surface 207 indicated by the shade in FIG. 16(A). As a result, the second left pressure-sensitive switch pair 226L and the second right pressure-sensitive switch pair 226R are turned ON so that the pressure-sensitive sensor unit 219 is turned ON. As shown in FIG. 16(B), when the occupant is seated more forward than in the case of FIG. 16(A), the first pair of left pressure-sensitive switches 225L and the first pair of right pressure-sensitive switches 225R are turned on. As a result, the pressure-sensitive sensor unit 219 turns ON. As shown in FIG. 16(C), even when the occupant is seated more to the right than in the case of FIG. 16(A), the righthand-side pressure-sensitive switch 220 of the second left pressure-sensitive switch pair 226L and the righthand-side pressure-sensitive switch 220 of the second right pressure-sensitive switch pair 226R are turned ON. As a result, the pressure-sensitive sensor unit 219 turns ON. As discussed above, by using the pressure-sensitive sensor unit 219 in this manner, the pressure-sensitive sensor unit 219 is turned on even when the occupant is displaced either in the forward or in the lateral directions.

Figure 16D:
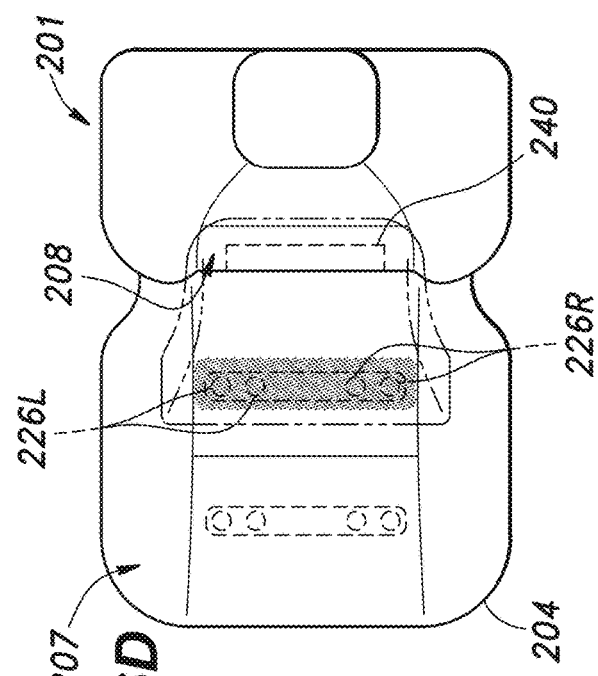

However, as shown in FIG. 16(D), suppose that a sack of rice (weighing about 30 kg) is placed on the seating surface 207, and a load is applied to the portion as indicated by the shade. This causes the second left pressure-sensitive switch pair 226L and the second right pressure-sensitive switch pair 226R to be turned on. In this case, if the determination unit 246 makes the determination based only on the signal from the pressure-sensitive sensor unit 219, an erroneous signal will be output.

However, in the present embodiment, the capacitance sensor 240 is turned on when an object having a high relative permittivity is located within a detection distance from the surface thereof. More specifically, the capacitance sensor 240 is turned ON when an object having a high relative dielectric constant, such as water or a human body, is located within a detection distance from a portion of the support surface 208 corresponding to the back of the hip region of the human body. Therefore, when the occupant (whose relative permittivity is about 40) is seated on the seating surface 207, or when the occupant is seated as shown in any of FIGS. 16(A) to 16(C), the capacitance sensor 240 is turned ON. On the other hand, when a sack of rice (having a relative dielectric constant of about 4) is placed on the seating surface 207, or in the case of FIG. 16(D), the capacitance sensor 240 is turned OFF. As described above, since the determination unit 246 determines if the occupant is seated or not according to the signal from the pressure-sensitive switch 220 and the signal from the capacitance sensor 240, the determination unit 246 is able to distinguish an object having a large weight and a low relative permittivity, such as a sack of rice. As described above, by configuring the determination unit 246 so as to perform the determination process based on the signal from the pressure-sensitive switch 220 and the signal from the capacitance sensor 240, it is possible to distinguish between the case where the occupant is seated on the vehicle seat 201 and the case where an article other than a human is placed on the seating surface 207 in a reliable manner.

In the present embodiment, as shown in FIG. 11, the pressure-sensitive sensor unit 219 is provided on the seat cushion 204, and the capacitance sensor 240 is provided on the seat back 205. Accordingly, as compared to a case where both the pressure-sensitive sensor unit 219 and the capacitance sensor 240 are provided on the seat cushion 204, wiring for these sensor units can be simplified, and the assembly work is facilitated. Further, since the pressure-sensitive sensor unit 219 and the capacitance sensor 240 are provided in separate members, they do not overlap with each other. Thereby, these two sensor units can be both positioned close to the seating surface 207 with which the occupant's body comes into contact at the time of seating so that the sensitivity can be improved for both the sensor units.

If the electrodes of the pressure-sensitive switches 220 of the pressure-sensitive sensor unit 219 are positioned near the capacitance sensor 240, the capacitance may not be measured accurately, and the sensitivity of the capacitance sensor 240 may be impaired. Also, when the capacitance sensor 240 is located on the surface of the pressure sensor unit 219, the weight of the capacitance sensor 240 may cause the pressure sensor unit 219 to be erroneously turned on. In the present embodiment, since the pressure-sensitive sensor unit 219 and the capacitance sensor 240 are provided in the separate members, they do not interfere with each other so that the pressure-sensitive sensor unit 219 and the capacitance sensor 240 are allowed to operate without interfering with each other.

As shown in FIG. 12, the capacitance sensor 240 is positioned so as to correspond to the hip region H of the occupant, more specifically, behind the lumbar spine of the occupant. When the occupant is seated, the hip region H of the occupant is likely to contact or approach the support surface 208 of the seat back 205. By providing the capacitance sensor 240 at a position corresponding to the hip region H of the seated occupant, the capacitance sensor 240 can be brought closer to the body of the seated occupant. Thereby, the body of the seated occupant can be more reliably detected by the capacitance sensor 240.

As shown in FIG. 13, the first subunit 221 and the second subunit 222 are respectively positioned ahead of and behind the first lateral listing groove 215 and between the left and right first longitudinal listing grooves 216. By thus positioning the pressure-sensitive sensor unit 219 so as to avoid the first lateral listing groove 215 and the first longitudinal listing grooves 216, the pressure-sensitive sensor unit 219 can be arranged without any difficulty, and the deformation and displacement of the sensor unit 219 can be avoided. Further, by arranging the first subunit 221 and the second subunit 222 separately ahead of and behind the first lateral listing groove 215, the pressure applied to the seating surface 207 of the seat cushion 204 can be detected over a wider range. Accordingly, even when the occupant is seated on the front portion of the seating surface 207 or seated with a lateral shift, the seating of the occupant can be more reliably detected.

As shown in FIG. 11, the capacitance sensor 240 is positioned between the left and right second longitudinal listing grooves 236. By thus arranging the capacitance sensor 240 so as to avoid the listing grooves, assembling of the capacitance sensor 240 can be facilitated, and the deformation and displacement of the capacitance sensor 240 can be avoided, Fifth Embodiment The vehicle seat 251 according to a fifth embodiment of the present invention differs from that of the fourth embodiment in the number and arrangement of the capacitance sensors 240, the arrangement of the pressure-sensitive sensor units 219, and the contents of the determination process, but is otherwise similar to that of the fourth embodiment. Therefore, the parts similar those of the previous embodiment are omitted from the following description.

Figure 17:
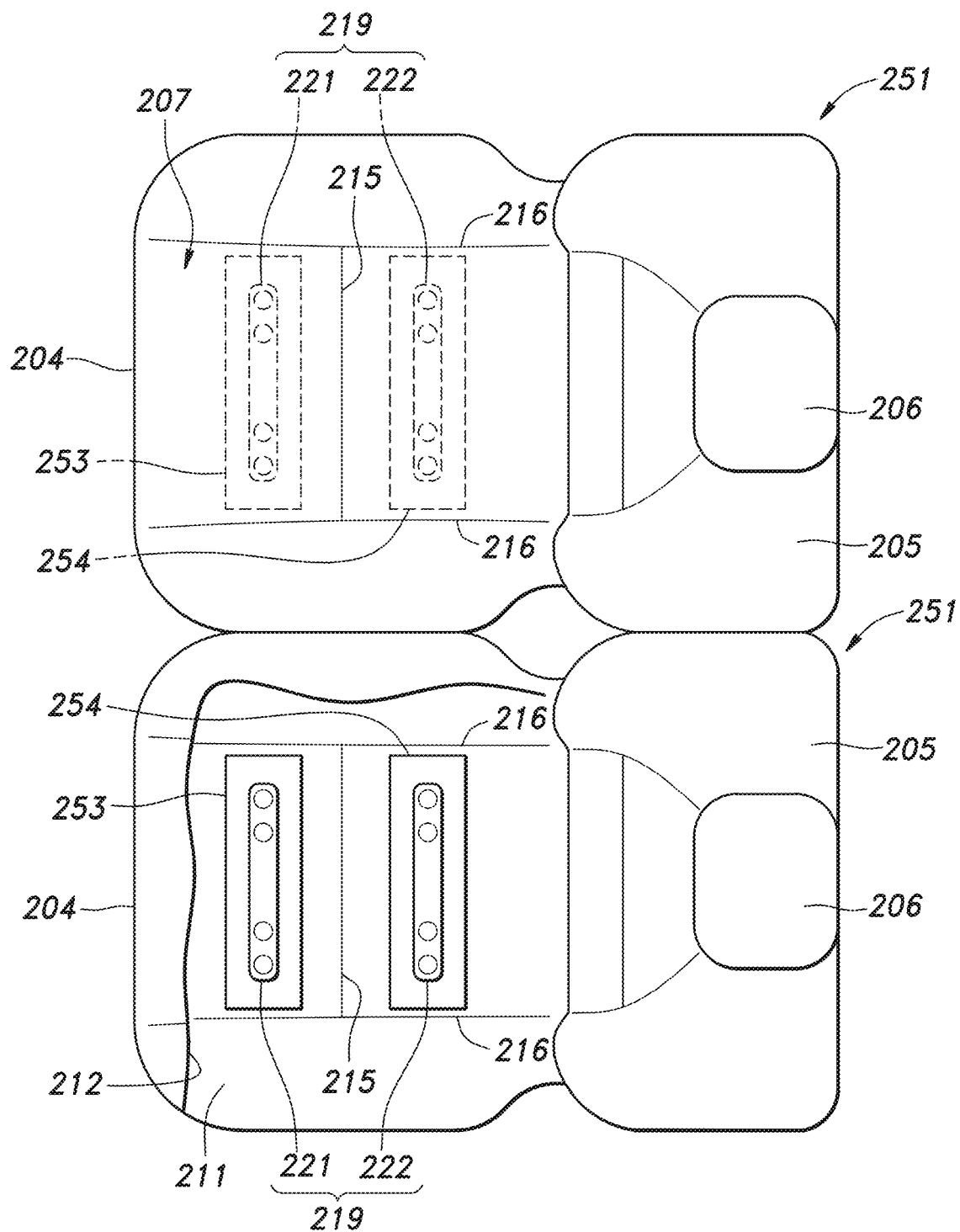
FIG. 17 is a top view of a vehicle seat according to a fifth embodiment of the present invention.

FIG. 17 is a top view of the vehicle seats 251 with the skin material 212 removed from the left vehicle seat 251. As shown in FIG. 17, each vehicle seat 251 of the fifth embodiment is provided with two capacitance sensors 253 and 254. The two capacitance sensors 253, 254 are both arranged on the seat cushion 204. More specifically, the seat cushion 204 is provided with the pressure-sensitive sensor unit 219 and the two capacitance sensors 240. The two capacitance sensors 240 are both positioned between the front surface of the pad member 211 forming the seat cushion 204 and the back surface of the skin material 212.

One of the two capacitance sensors 240 or the capacitance sensor 253 (first capacitance sensor 253) is positioned in front of the first lateral listing groove 215, and between the longitudinal listing grooves 216. The other capacitance sensor 254 (the second capacitance sensor 254) is positioned behind the first lateral listing groove 215 and between the first longitudinal listing grooves 216. Thus, two capacitance sensors 253 and 254 are arranged ahead of and behind the first lateral listing groove 215 extending laterally. The first capacitance sensor 253 and the second capacitance sensor 254 are each formed in a sheet form, and has a substantially rectangular shape elongated in the lateral direction. The back surfaces of the first capacitance sensor 253 and the second capacitance sensor 254 are in surface contact with the upper surface of the pad member 211 forming the seat cushion 204.

The first subunit 221 of the pressure-sensitive sensor unit 219 is arranged so as to at least partly overlap with the first capacitance sensor 253 in top view. In the present embodiment, the first subunit 221 is positioned on top of the first capacitance sensor 253 such that the first subunit 221 is located inside the outer peripheral edge of the first capacitance sensor 253 when viewed from above. The back surface of the first subunit 221 is arranged so as to be in surface contact with the first capacitance sensor 253.

The second subunit 222 of the pressure-sensitive sensor unit 219 is arranged so as to at least partly overlap with the second capacitance sensor 254 in top view. In the present embodiment, the second subunit 222 is positioned on top of the second capacitance sensor 254, and the second subunit 222 is located inside the outer peripheral edge of the second capacitance sensor 254 when viewed from above. The back surface of the second subunit 222 is arranged so as to be in surface contact with the second capacitance sensor 254.

The determination unit 246 determines if an occupant is seated from the ON/OFF state of the pressure-sensitive sensor unit 219 and the ON/OFF states of the two capacitance sensors 240 received from the input unit. The determination process executed by the determination unit 246 for the vehicle seat 251 according to the fifth embodiment is different from the fourth embodiment only in step ST2 so that the description of the other parts of the determination process is omitted from the following description.

In step ST2, the determination unit 246 determines if one of the first capacitance sensor 253 and the second capacitance sensor 254 is ON. If at least one of these two capacitance sensors is ON, step ST3 is executed. When both the first capacitance sensor 253 and the second capacitance sensor 254 are OFF, the determination process ends.

The effect of the vehicle seat 251 configured as described above is discussed in the following. The two capacitance sensors 240 are both provided so as to be close to the seating surface 207 of the seat cushion 204 on which the occupant sits. Since the seating surface 207 is a region where the seated occupant is highly likely to be in contact with, the two capacitance sensors 240 are likely to be brought closer to the seated occupant. This allows the capacitance sensors 240 to more accurately detect the occupant's seating.

Further, the first subunit 221 and the first capacitance sensor 253 are arranged so as to overlap each other when viewed from above, and the second subunit 222 and the second capacitance sensor 254 similarly overlap with each other. Therefore, the surface area of the pad member 211 of the seat cushion 204 where the pressure-sensitive sensor unit 219 and the capacitance sensor 240 are arranged can be reduced. By arranging the pressure-sensitive sensor unit 219 and the capacitance sensor 240 in this manner, any discomfort to the seat occupant can be minimized.

In the present embodiment, further, the first subunit 221 is positioned inside the outer periphery of the first capacitance sensor 253, and the second subunit 222 is positioned inside the outer periphery of the second capacitance sensor 254. Owing to this arrangement, the area over which the pressure-sensitive sensor unit 219 and the capacitance sensor 240 overlap with each other can be further increased. Accordingly, the surface area of the pad member 211 of the seat cushion 204 where the pressure-sensitive sensor unit 219 and the capacitance sensor 240 are arranged can be minimized so that the discomfort to the seat occupant can be further reduced.

The first capacitance sensor 253 and the second capacitance sensor 254 are positioned ahead of and behind the first lateral listing groove 215, respectively, and between the left and right first longitudinal listing grooves 216. Accordingly, the first capacitance sensor 253 and the second capacitance sensor 254 can be arranged so as to avoid the first lateral listing groove 215 and the first longitudinal listing grooves 216. As a result, the assembling of the pressure-sensitive sensor unit 219 and the two capacitance sensors 253 and 254 can be facilitated, and the deformation and displacement of the pressure-sensitive sensor unit 219 and the two capacitance sensors 253 and 254 can be minimized. Since the first capacitance sensor 253 and the second capacitance sensor 254 are arranged ahead of and behind the first lateral listing groove 215, respectively, the first capacitance sensor 253 is turned on when the occupant is seated in a front part of the seating surface 207 while the second capacitance sensor 254 is turned on when the occupant is seated in a rear part of the seating surface 207. As a result, the seating of a seat occupant over a wide range in the fore and aft direction can be detected.

Sixth Embodiment

The vehicle seat 261 according to a sixth embodiment of the present invention is different from the vehicle seat 201 of the fifth embodiment in the shape of the first capacitance sensor 253 and the second capacitance sensor 254, but is otherwise similar to the vehicle seat of the fifth embodiment. Therefore, other parts of the vehicle seat 261 of the sixth embodiment are omitted from the following description.

Figure 18:
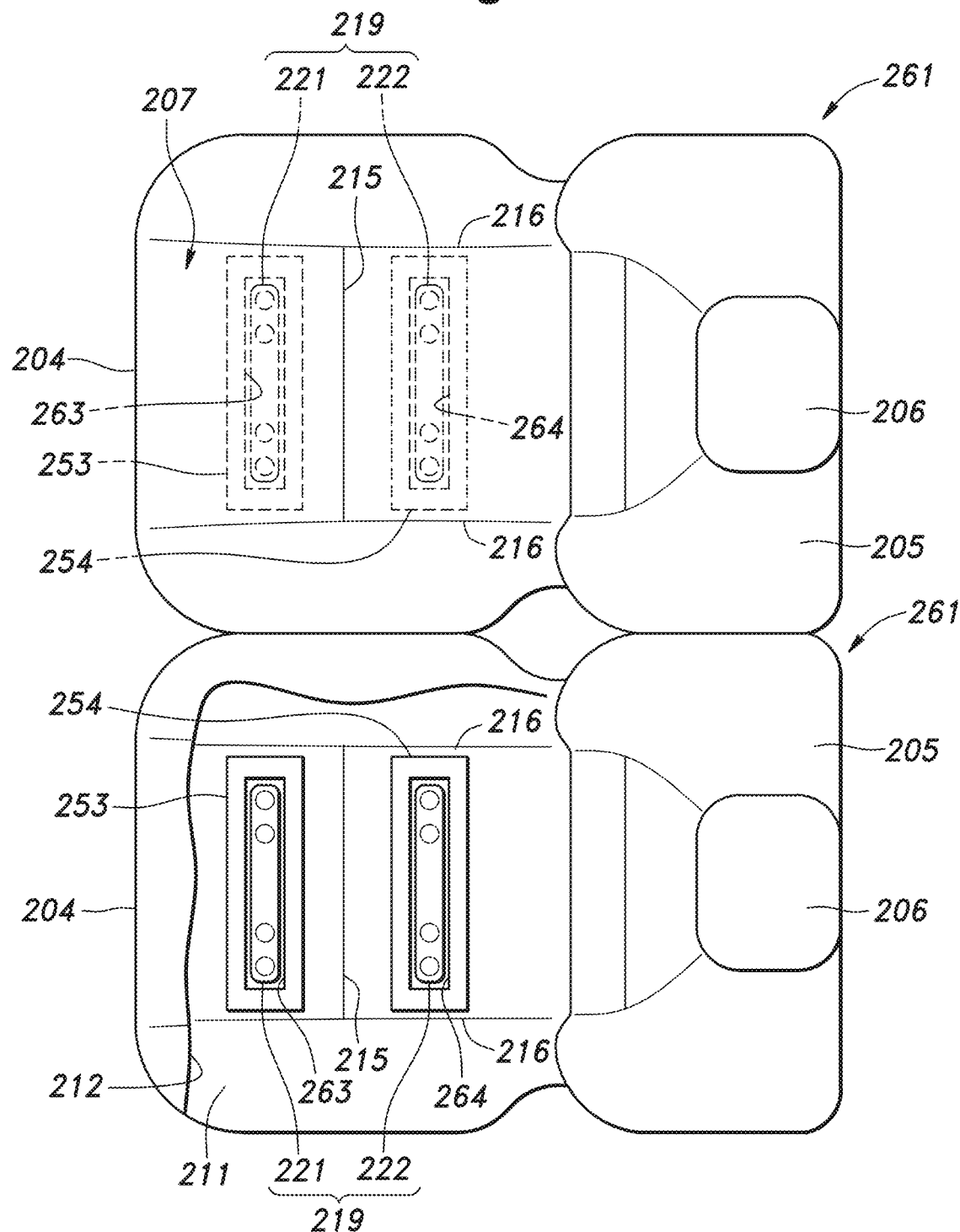
FIG. 18 is a top view of a vehicle seat according to a sixth embodiment of the present invention.

FIG. 18 is a top view of two vehicle seats 261 of which the left vehicle seat 261 is shown with a part of the skin material 212 removed therefrom. As shown in FIG. 18, the first capacitance sensor 253 and the second capacitance sensor 254 are each in a sheet form of a substantially rectangular shape elongated in the lateral direction. Each of the first capacitance sensor 253 and the second capacitance sensor 254 is provided with an opening 263 and 264 passed vertically therethrough. The openings 263 and 264 each have a substantially rectangular shape elongated in the lateral direction.

The first capacitance sensor 253 is located in front of the first lateral listing groove 215 and between the first longitudinal listing grooves 216 laterally spaced from each other. The second capacitance sensor 254 is positioned behind the first lateral listing groove 215 and between the first longitudinal listing grooves 216. Therefore, the two capacitance sensors 253 and 254 having the openings 263 and 264 are respectively arranged ahead of and behind the first lateral listing groove 215 extending laterally. The back surfaces of the first capacitance sensor 253 and the second capacitance sensor 254 are in surface contact with the upper surface of the pad member 211 of the seat cushion 204.

The first subunit 221 is positioned inside the opening 263 of the first capacitance sensor 253. The back surface of the first subunit 221 is in surface contact with the pad member 211 of the seat cushion 204. In the present embodiment, the thickness of the first subunit 221 and the thickness of the first capacitance sensor 253 are substantially equal to each other so that the upper surface of the first subunit 221 and the upper surface of the first capacitance sensor 253 are flush with each other.

The second subunit 222 is positioned inside the opening 264 of the second capacitance sensor 254. The back surface of the second subunit 222 is in surface contact with the pad member 211 of the seat cushion 204. In the present embodiment, the thickness of the second subunit 222 is substantially equal to the thickness of the second capacitance sensor 254 so that the upper surface of the second subunit 222 and the upper surface of the second capacitance sensor 254 are flush with each other.

The first capacitance sensor 253, the second capacitance sensor 254, the first subunit 221 and the second subunit 222 are all positioned between the pad member 211 of the seat cushion 204 and the skin material 212.

The effect of the vehicle seat 261 configured as described above is discussed in the following. The first subunit 221 is positioned inside the opening 263 of the first capacitance sensor 253 so that a step is less likely to be produced between the upper surface of the first subunit 221 and the upper surface of the first capacitance sensor 253. Similarly, the second subunit 222 is positioned inside the opening 264 of the second capacitance sensor 254 so that a step is less likely to be produced between the upper surface of the second subunit 222 and the upper surface of the second capacitance sensor 254. As a result, a step is less likely to be produced on the seating surface 207 so that the seating comfort can be improved. In this embodiment, the upper surface of the first subunit 221 and the upper surface of the first capacitance sensor 253 are flush with each other, and the upper surface of the second subunit 222 and the upper surface of the second capacitance sensor 254 are also flush with each other so that the seating surface 207 can be made of a highly even planar surface. Thereby, the sitting comfort can be further improved.

The first capacitance sensor 253 and the second capacitance sensor 254 are positioned between the left and right first longitudinal listing grooves 216 and ahead of and behind the first lateral listing groove 215, respectively. Therefore, the two capacitance sensors 253 and 254 can be positioned so as to avoid the first lateral listing groove 215 and the first longitudinal listing grooves 216. As a result, the assembling of the capacitance sensors 253 and 254 can be facilitated, and deformation and displacement of the pressure-sensitive sensor unit 219 and the two capacitance sensors 253 and 254 can be minimized. Further, by arranging the two capacitance sensors 253 and 254 in front of and behind the first lateral listing groove 215, respectively, the occupant's seating can be detected over a wider range in the fore and aft direction.

Seventh Embodiment

The vehicle seat 271 according to a seventh embodiment of the present invention differs from the vehicle seat 201 of the fourth embodiment only in the positioning of the capacitance sensor 240 and the structure and positioning of the pressure-sensitive sensor unit 219, but is otherwise similar to the vehicle seat 201 of the fourth embodiment. Therefore, the remaining parts of the vehicle seat 271 are omitted from the following description.

FIG. 19 is a top view of two vehicle seats 271 of which the left vehicle seat 271 is shown with a part of the skin material 212 removed therefrom. As shown in FIG. 19, the capacitance sensor 240 is placed between the front surface of the pad member 211 of the seat cushion 204 and the back surface of the skin material 212 of the seat cushion 204. The capacitance sensor 240 is positioned on the surface of the pad member 211 in front of the first lateral listing groove 215 and between the left and right first longitudinal listing grooves 216. The back surface of the capacitance sensor 240 is in surface contact with the front surface of the pad member 211 of the seat cushion 204.

Unlike the preceding embodiment, the pressure-sensitive sensor unit 219 does not include a second subunit 222, and instead consists solely of the first subunit 221. When the first left pressure-sensitive switch pair 225L is ON and the first right pressure-sensitive switch pair 225R is ON, the pressure-sensitive sensor unit 219 is turned ON.

The pressure sensor unit 219 (the first subunit 221) is also provided between the front surface of the pad member 211 of the seat cushion 204 and the back surface of the skin material 212 of the seat cushion 204. The pressure-sensitive sensor unit 219 is positioned behind the first lateral listing groove 215 and between the left and right first longitudinal listing grooves 216. The back surface of the pressure-sensitive sensor unit 219 is in surface contact with the front surface of the pad member 211 of the seat cushion 204.

The effect of the vehicle seat 271 thus configured is discussed in the following. Since both the pressure-sensitive sensor unit 219 and the capacitance sensor 240 are positioned near the seating surface 207, the seating of an occupant can be detected with a higher sensitivity. In addition, since the pressure-sensitive sensor unit 219 and the capacitance sensor 240 are positioned so as to avoid the first lateral listing groove 215 and the first longitudinal listing grooves 216, the assembling of these sensors to the seat cushion 204 is facilitated. Further, deformation and displacement of the pressure-sensitive sensor unit 219 and the capacitance sensor 240 when the occupant is seated can be minimized. Further, by positioning the pressure-sensitive sensor unit 219 behind the first lateral listing groove 215, the load of the occupant can be made more likely to be transmitted to the pressure-sensitive sensor unit 219, as compared with the case where the pressure-sensitive sensor unit 219 is positioned in front of the first lateral listing groove 215, so that the detection of the seating of an occupant can be detected in a more reliable manner.

The present invention has been described in terms of specific embodiments, but is not limited by such embodiments, and can be modified in various ways without departing from the scope of the present invention. For example, in the first embodiment and the second embodiment, the recess 45 may be provided in the floor portion 5 instead of the back surface of the seat cushion pad 11. In other words, the recess 45 may be provided on one of the back surface of the seat cushion pad 11 and the floor portion 5. Similarly, the recess 45 may be provided on one of the back surface of the seat back pad 51 and the wall portion 6.

In the first embodiment and the second embodiment, the open end of the wire harness passage 35 on the front surface side may also be provided inside the listing groove. The open end on the front surface side of the wire harness passage 35 may be provided in any one of the left and right longitudinal grooves and the front and rear lateral grooves.

In the third embodiment, the ninth branch part 111K may also extend rearward from the center of the main part 111A. In this case, the connecting portion 114 may be provided at the rear end of the ninth branch part 111K, and the connecting portion 114 may be positioned ahead of the first imaginary straight line L1. The ninth branch part 111K may extend leftward from the left end of the main part 111A, and may extend rightward from the right end of the main part 111A. Each branch part 111B to 111K may be curved or bent.

In the fifth embodiment, the pressure-sensitive sensor unit 219 and the capacitance sensor 240 are provided separately, but the pressure-sensitive switch 220 and the capacitance sensor 240 may also be provided on one sheet-like member. In the foregoing embodiments, the determination unit 246 is attached to the lower surface of the seat cushion 204, but the present invention is not limited to this mode. For example, the determination unit 246 may be placed on a predetermined position on the floor 203, or may be formed by software incorporated in the control unit 248.

LIST OF REFERENCE NUMERALS

| | |
|---|---|
| 1: seat of a first embodiment | 2: seat cushion |
| 3: seat back | 4: body panel |
| 5: floor portion | 6: wall portion |
| 11: seat cushion pad | 12: skin material |
| 14: rigid part | 15: soft part |
| 20: listing groove | 28: rear inclined portion |
| 30: pressure receiving area | 32: sensor |
| 33: wire harness | 35: wire harness passage |
| 37: air passage | 41: locking portion |
| 45: recess | 51: seat back pad |

-continued

LIST OF REFERENCE NUMERALS

| | |
|---|---|
| 52: skin material | 57: sensor |
| 58: wire harness passage | 59: wire harness |
| 61: recess | 70: seat of a second embodiment |
| 72: heater cloth | 101: seat of a third embodiment |
| 102: seat cushion | 105: seating region |
| 106: seat cushion pad | 107: skin material |
| 110: seat sensor | 111: sheet material |
| 111A: the main part | 111B to 111K: first to ninth branch parts |
| 112B to 112J: first to eighth pressure-sensitive switches | 114: connecting portion |
| 113: wiring | 117: second circuit |
| 116: first circuit | 119: fourth circuit |
| 118: third circuit | 201: vehicle seat of a fourth embodiment |
| 122: control unit | |
| 204: seat cushion | 205: seat back |
| 206: headrest | 215: first lateral listing groove |
| 220: pressure-sensitive switch (pressure sensor) | 240: capacitance sensor |
| | 251: vehicle seat of a fifth embodiment |
| 236: second longitudinal listing groove | 254: second capacitance sensor |
| 246: determination unit | 263, 264: opening |
| 253: first capacitance sensor | HP: hip point |
| 261: vehicle seat of a sixth embodiment | L2: second imaginary straight line |
| 271: vehicle seat of a seventh embodiment | |
| L1: first imaginary straight line | |
| H: hip | |

The invention claimed is:

1. A vehicle seat, comprising:
a seat cushion including a pad and a skin material covering an upper surface of the pad,
wherein the pad includes a rigid part and a soft part having a higher flexibility than the rigid part and provided on the rigid part,
wherein an air passage is formed from the upper surface of the pad to a lower surface of the pad, and
wherein a blower is provided at the air passage, and
wherein the air passage is provided at the soft part.

2. The vehicle seat according to claim 1, wherein the rigid part includes a front rigid part forming a front part of the rigid part, a rear rigid part forming a rear part of the rigid part, and a part of the air passage overlaps the front rigid part in vertical direction.

3. The vehicle seat according to claim 2, wherein the air passage includes a collecting portion opening on the lower surface of the pad, a branch part branched from the collecting portion to open on a front surface of the pad, and a part of the branch part overlaps the front rigid part in vertical direction.

4. The vehicle seat according to claim 3, wherein a front end of the branch part is located in front of a rear end of the front rigid part.

5. The vehicle seat according to claim 4, wherein a rear end of the branch part is located in back of a rear end of the front rigid part and front of a front end of the soft part in lateral view.

6. The vehicle seat according to claim 5, wherein a part of the collecting portion includes a horizontal extending portion extending horizontally and connected to the branch part, and the horizontal extending portion is located at same height as atop of the front rigid part.

7. The vehicle seat according to claim 6, wherein the soft part includes a projecting portion projecting in a bottom direction, the collecting portion includes a vertically extending portion extending vertically and connected to the horizontally extending portion, and the blower and a part of the vertically extending portion is provided at the projecting portion.

8. The vehicle seat according to claim 7, wherein the branch part includes a first branch located in front of the rear end of the front rigid part, and a second branch located in front of the rear end of the front rigid part and a rear of the first branch, the first branch has vertical length longer than the second branch in lateral view.

9. The vehicle seat according to claim 8, wherein the first branch and the second branch open at a surface of the soft part that has a downward slope toward a rear, and wherein the upper surface of the rear of the front rigid part has a downward slope toward the rear and parallel to the surface of the soft part at which the first branch and the second branch open.

10. The vehicle seat according to claim 9, wherein a listing groove is formed on the upper surface of the pad, and includes a pair of longitudinal parts and a pair of lateral parts, the branch part has openings at the upper surface of the pad, all of the openings of the branch part are located in front of both of the lateral parts, and the rear end of the horizontal extending portion locates behind one of the lateral parts.

11. The vehicle seat according to claim 10, wherein a front portion of the horizontally extending portion vertically overlaps the front rigid part in a lateral view, and a rear portion of the horizontally extending portion vertically overlaps the projecting portion, in the lateral view.

12. The vehicle seat according to claim 11, comprising a panel supporting the pad;
wherein the surface of the panel faces vertically, the pad is placed on an upper surface of the panel to be rotatable around a center located in a rear end portion thereof, and
wherein the blower is mounted a part of a bottom of the projecting portion, and
wherein both the projecting portion and the blower touch the upper surface of the panel.

13. The vehicle seat according to claim 12, wherein a front part of the branch part is located in front of a region of the projecting portion touched to the panel in the lateral view, and a rear part of the branch part is located in rear of a rear edge of a region of the projecting portion touching the panel in the lateral view.

14. The vehicle seat according to claim 13, comprising a sensor mounted at the surface of the pad,
wherein the sensor vertically overlaps the horizontally extending portion in the lateral view.

15. The vehicle seat according to claim 14, wherein the pair of lateral parts of the listing groove includes a front lateral part, and a rear lateral part located in rear of the front lateral part, and
wherein a front edge of the sensor is located in rear of the front lateral part and is located at the front of a rear edge of the horizontally extending portion.

16. The vehicle seat according to claim 15, wherein a pair of locking portions are provided at the upper surface of the pad, all of the openings of the branch part are located between the locking portions in left and right direction, and all of the opening of the branch part are located in front of the front lateral part.

17. The vehicle seat according to claim 16, wherein a heater cloth incorporated with a heater wire on upper surface of the pad,
wherein the heater cloth overlaps a region of the upper surface of the pad located in front of the sensor and in rear of all of the openings of the branch part.

18. A seat cushion of a vehicle seat comprising,
a pad,
a skin material covering an upper surface of the pad,
wherein the pad includes a rigid part and a soft part having a higher flexibility than the rigid part and provided on the rigid part,
wherein an air passage is formed from the upper surface of the pad to a lower surface of the pad,
wherein a blower is provided at the air passage,
wherein the air passage is provided at the soft part, and
wherein a through hole for a wire harness is formed in a position of the pad to avoid the air passage.

* * * * *